US010855760B2

(12) United States Patent
Ratias

(10) Patent No.: US 10,855,760 B2
(45) Date of Patent: *Dec. 1, 2020

(54) SYSTEMS AND METHODS FOR SYNCHRONIZING CONTENT AND INFORMATION ON MULTIPLE COMPUTING DEVICES

(71) Applicant: Cole Asher Ratias, San Rafael, CA (US)

(72) Inventor: Cole Asher Ratias, San Rafael, CA (US)

(*) Notice: Subject to any disclaimer, the term of this patent is extended or adjusted under 35 U.S.C. 154(b) by 298 days.

This patent is subject to a terminal disclaimer.

(21) Appl. No.: 15/948,984

(22) Filed: Apr. 9, 2018

(65) Prior Publication Data
US 2018/0234496 A1 Aug. 16, 2018

Related U.S. Application Data

(63) Continuation-in-part of application No. 14/536,587, filed on Nov. 7, 2014, now Pat. No. 9,973,374.
(Continued)

(51) Int. Cl.
H04L 29/08 (2006.01)
H04L 9/08 (2006.01)
(Continued)

(52) U.S. Cl.
CPC ........ H04L 67/1095 (2013.01); A63F 13/213 (2014.09); A63F 13/352 (2014.09);
(Continued)

(58) Field of Classification Search
CPC ..... G06F 16/27; G06F 9/451; H04L 67/1095; H04L 67/18; H04L 67/22; H04L 67/26;
(Continued)

(56) References Cited

U.S. PATENT DOCUMENTS 9,112,936 B1 8/2015 Poletto
2009/0083288 A1 3/2009 LeDain
(Continued)

FOREIGN PATENT DOCUMENTS

WO WO-2014142505 A1 * 9/2014 ........ H04W 56/0025
WO WO-2015058610 A1 * 4/2015 ......... H04N 21/8456

OTHER PUBLICATIONS

Silicon Labs, "Timing and Synchronization in Broadcast Video", Copyright (c) 2009 by Silicon Laboratories, pp. 18 (Year: 2009).*
(Continued)

Primary Examiner — Chau T Nguyen
(74) Attorney, Agent, or Firm — Edward C. Kwok; VLP Law Group, LLP

(57) ABSTRACT

A method for synchronizing content between a first electronic device and a second electronic device in response to an input signal, includes: (a) receiving a first synchronization signal from the first computing device that is based on the input signal being received in the first electronic device; (b) mapping the first synchronization signal to a second synchronization signal based on mapping information accessible to the second electronic device, wherein the second synchronization signal includes information not represented by the first synchronization signal; and (c) transmitting the second synchronization signal to the second electronic device for processing, wherein (i) the input signal comprises one or more sensors; (ii) the first electronic device comprises a controller that interprets the input signal to provide the first synchronization signal, and (iii) the second electronic device comprises an actuator and wherein the second synchronization signal corresponds to a command for actuation in the second electronic device.

20 Claims, 13 Drawing Sheets

Related U.S. Application Data

(60) Provisional application No. 61/901,129, filed on Nov. 7, 2013.

(51) Int. Cl.

| | |
|---|---|
| *H04L 9/32* | (2006.01) |
| *A63F 13/60* | (2014.01) |
| *H04L 9/14* | (2006.01) |
| *A63F 13/79* | (2014.01) |
| *A63F 13/213* | (2014.01) |
| *A63F 13/352* | (2014.01) |
| *G06F 16/27* | (2019.01) |
| *H04W 56/00* | (2009.01) |
| *G06F 9/451* | (2018.01) |
| *A63F 13/34* | (2014.01) |

(52) U.S. Cl.
CPC .............. *A63F 13/60* (2014.09); *A63F 13/79* (2014.09); *G06F 9/451* (2018.02); *G06F 16/27* (2019.01); *H04L 9/0816* (2013.01); *H04L 9/0861* (2013.01); *H04L 9/14* (2013.01); *H04L 9/3239* (2013.01); *H04L 67/22* (2013.01); *H04L 67/26* (2013.01); *H04L 67/306* (2013.01); *H04W 56/001* (2013.01); *A63F 13/34* (2014.09); *H04L 67/18* (2013.01); *H04L 2209/38* (2013.01)

(58) Field of Classification Search
CPC ... H04L 67/306; H04L 9/0816; H04L 9/0861; H04L 9/14; H04L 9/3239; H04L 2209/38; H04W 56/001; A63F 13/213; A63F 13/34; A63F 13/352; A63F 13/60; A63F 13/79

See application file for complete search history.

(56) References Cited

U.S. PATENT DOCUMENTS

| | | | |
|---|---|---|---|
| 2011/0202848 | A1 | 8/2011 | Ismalon |
| 2012/0263166 | A1* | 10/2012 | Cho .................. G06F 16/27 370/350 |
| 2014/0282213 | A1 | 9/2014 | Musa |
| 2015/0248435 | A1 | 9/2015 | Solheim |
| 2016/0119413 | A1 | 4/2016 | Antipa |
| 2018/0234612 | A1* | 8/2018 | Kunkel .............. H04N 5/23206 |
| 2019/0260929 | A1* | 8/2019 | Kaneko .............. H04N 21/2365 |

OTHER PUBLICATIONS

Pereira et al., "Enabling Cloud-connectivity for Mobile Internet of Things Applications", 2013 IEEE Seventh International Symposium on Service-Oriented System Engineering, pp. 9 (Year: 2013).*

* cited by examiner

SYSTEMS AND METHODS FOR SYNCHRONIZING CONTENT AND INFORMATION ON MULTIPLE COMPUTING DEVICES

CROSS REFERENCE TO RELATED APPLICATIONS

This application is a continuation-in-part application of co-pending U.S. patent application ("Co-pending application"), Ser. No. 14/536,587, entitled "SYSTEMS AND METHODS FOR SYNCHRONIZING CONTENT AND INFORMATION ON MULTIPLE COMPUTING DEVICES", filed on Nov. 7, 2014, which claims priority to U.S. Provisional patent application ("Provisional application"), Ser. No. 61/901,129, filed Nov. 7, 2013. The Co-pending application and the Provisional application are herein incorporated by reference in their entireties.

BACKGROUND OF THE INVENTION

Field of the Invention

The present invention relates to electronic systems that have enabled sharing of information across multiple electronic devices, such as desktop computers, mobile computers, mobile communication devices, display devices, storage devices, and Internet of Things (IoT) sensor and other devices.

SUMMARY OF THE INVENTION

According to one embodiment of the present invention, content may be synchronized across multiple screens or devices, including features of mapping of content between computing devices, synchronization, display or other processing across multiple screens or devices. In one embodiment, a system of the present invention synchronizes content, data or information among the multiple computing devices. The system may include a synchronization server that is in communication with multiple computing device or devices over a wide area computer network (e.g., the Internet). For example, the computing devices may include one or more computers and smart phones. In some embodiments, the synchronization server may have access to a user database that stores information about each of the system users. This user information can include detailed information about the computing devices, their associated users, and other computing devices used by such users. The detailed information may include, for example, screen resolutions, GPS positions, sensor data (e.g., fingerprints, temperatures, barometric and measurements), and device types (e.g., television, smart phone, smart watch, and internet-connected vending machines).

In one exemplary implementation, there is provided a method for synchronizing content between computing devices that includes providing a synchronization server in communication with first and second computing devices each having a display. The first computing device can emit a first synchronization signal to the synchronization server. The first synchronization signal may be emitted at a time that is determined based upon a user interaction with the first computing device, or upon detection of a qualified event by a sensor coupled to the first computing device. For example, the first synchronization signal can be transmitted when the user uses a browser program to transmit a uniform resource locator (URL) to a web server. User interaction with the first web server or synchronization server can cause the first computing device to transmit the first synchronization signal.

The first computing device and the synchronization server can determine other user computing devices that are "online". In this context, an "online" computing device is one that is running a synchronization program. The online determination can be achieved through a polling process facilitated, for example, by the extensible messaging and presence protocol (XMPP). Of course, the XMPP protocol is discussed herein merely as an example of such protocols. Any protocol that allows ascertaining the on-line presence of a device may be used. When a user device is online, it can transmit a signal directly to each of the user's other computing devices or "related" devices. Related devices may be identified or recognized by the synchronization server (e.g., "related" devices may include devices within location proximity, as determined by the synchronization server, or devices belonging to friends of the user). Depending on its online or offline status of a related computing device, the synchronization server can transmit a message, data or a signal to that related device. Such a message, data or signal, as well as its delivery method, may be determined by the synchronization server. By knowing the devices that are online or offline, the system can properly map the first synchronization signal to each second synchronization signal that is transmitted through the appropriate type of notification delivery to each second synchronization device.

In one embodiment, the mapping is performed by the synchronization server which then transmits a second synchronization signal to each second computing device. However, in other embodiments the mapping can be performed by each second computing device. In one embodiment, the mapping process can be performed through a mapping table by matching the first synchronization signal to a second synchronization signal for each second computing device in the mapping table. The mapped second synchronization signal is then processed by the corresponding second computing device.

In some configurations, the mapping can be fairly straightforward. A first synchronization signal that is a URL may be mapped to a second synchronization signal that is the mobile-optimized version of the same URL. This mapping can result in the first computing device displaying the normal URL and the second computing device displaying the mobile-optimized URL. However, in other embodiments, the mapping formats can be substantially different. A first synchronization signal can be a cursor position on the screen of the first computing device which can be mapped to an image such as a .JPG file or an audio signal which can be output by the second computing device.

In some applications, the first synchronization signal from the first computing device can be mapped to the same synchronization signal. Thus, the first synchronization signal can also be the second synchronization signal. This can be useful when a user is working on a document on multiple devices. For example, if a user is working on a text document using a word processing program on the first computing device, the first synchronization signal can be the text document. The text document first synchronization signal can be mapped to a second synchronization signal that is the same text document. The second computing device can respond to the second synchronization signal by opening the text document using a word processing program on the second device. The user can then switch to using the second computing device to continue work on the text document. When changes are made to the text document, the described process can be repeated with the second computing device emitting the edited text document as a third synchronization signal. Mapping can occur that transmits the edited text document as a fourth synchronization signal back to the first computing device. Again, the mapping can occur at a synchronization server or on the first or second computing device. Thus, the synchronization signals can be transmitted back and forth between the first and second computing devices (or more than two devices, as appropriate). This process allows continuous updating and refreshing of information, so that the multiple devices can continuously synchronize with each other.

In some embodiments, the first and second computing devices can have different sensors or components that can provide enhanced functionality when the computing devices are used in combination. For example, many smart phones now have a fingerprint sensor that is used to prevent unauthorized access of the smart phone and its stored data. In one embodiment of the present invention, the fingerprint sensor on the smart phone can be used as a security mechanism for a separate computing device.

In one embodiment, the system can be configured such that a computer serves as a first computing device and a smart phone with a fingerprint sensor serves as a second computing device. In one application, the first computing device may access the user's private information through a website. When the first computing device accesses the URL for a login page of the private information website, that action of access may serve as the first synchronization signal. The URL of the login page can be mapped to a second synchronization signal that may result in running a program that displays a fingerprint sensor prompt on a second device (e.g., a smart phone). As discussed, the mapping can be done in a synchronization server or, alternatively, on the first or second computing device. The second synchronization signal may be downloaded to the first or second device, which may be then updated or changed by the synchronization server. The smart phone can respond to the second synchronization signal by displaying instructions for the user to interact with the fingerprint sensor to complete the login of the user to the private information website on the first device. The user can then touch the fingerprint sensor and the second computing device can compare the input fingerprint to the stored fingerprint for the user. If there is a match, the second computing device transmits a confirmation third synchronization signal to the first computing device to allow the user to be granted access to the private information through the website on the first device. Alternatively, if the fingerprint does not match, the second computing device can inform the user to try again or that the fingerprint is not a match and can transmit the fingerprint mismatch message as the third synchronization signal to the first computing device.

This above-described fingerprint sensor system can be used for various applications in the first computing device. For example, in one embodiment in which a user first logs onto the first computing device, this login can serves as the first synchronization signal that is mapped into a second synchronization signal for a second computing device that includes a fingerprint sensor (e.g., a third-party fingerprint sensor device, a smart phone with a fingerprint sensor, or another desktop computer with a fingerprint sensor). The second computing device can respond to the second synchronization signal by displaying instructions for the user to interact with the fingerprint sensor to complete the login on the first computing device. If the second computing device confirms that the fingerprint is a match, a print match confirmation is sent as the third synchronization signal to the first computing device, which will complete the user login. If the fingerprint sensor does not confirm the match with the stored fingerprint, the second computing device sends a rejection signal to the first computing device to block the user login.

In other embodiments, the system may require additional information (e.g., a password, a personal identification number "PIN" or any other security information) on top of the fingerprint confirmation to complete the login process. For example, the second computing device may transmit a fingerprint match confirmation as well as the user's PIN in the third synchronization signal to the first computing device. The first computing device can complete the login if the first computing device determines that the PIN information provided is also a match ("match" as defined by mapping from the synchronization server).

It is to be understood that both the foregoing general description and the following detailed description are exemplary and explanatory only and are not restrictive of the present invention described herein. Further features or variations may be provided in addition to those set forth herein. For example, the present invention may be directed to various combinations and sub-combinations of the disclosed features or combinations and sub-combinations of several further features disclosed below in the detailed description.

BRIEF DESCRIPTION OF THE DRAWINGS

The accompanying drawings, which constitute a part of this specification, illustrate various implementations and aspects of the innovations herein and, together with the description, help illustrate the principles of the present inventions. In the drawings.

DETAILED DESCRIPTION

Reference will now be made in detail to the inventions herein, examples of which are illustrated in the accompanying drawings. The implementations set forth in the following description do not represent all implementations consistent with the present inventions. Instead, they are merely some examples consistent with certain aspects related to the present innovations. Wherever possible, the same reference numbers will be used throughout the drawings to refer to the same or like parts.

Systems and methods consistent with innovations herein are directed to synchronizing content across multiple screens or devices, including implementations wherein various mapping, synchronization, display or other processing occurs. For example, innovations herein may relate to systems and methods for synchronizing content across multiple screens, where an input signal is sent from an initial screen to a synchronization server where it is mapped to the appropriate output signal, data or content for a secondary screen, and then further processed or sent to the secondary screen for display.

Figure 1:
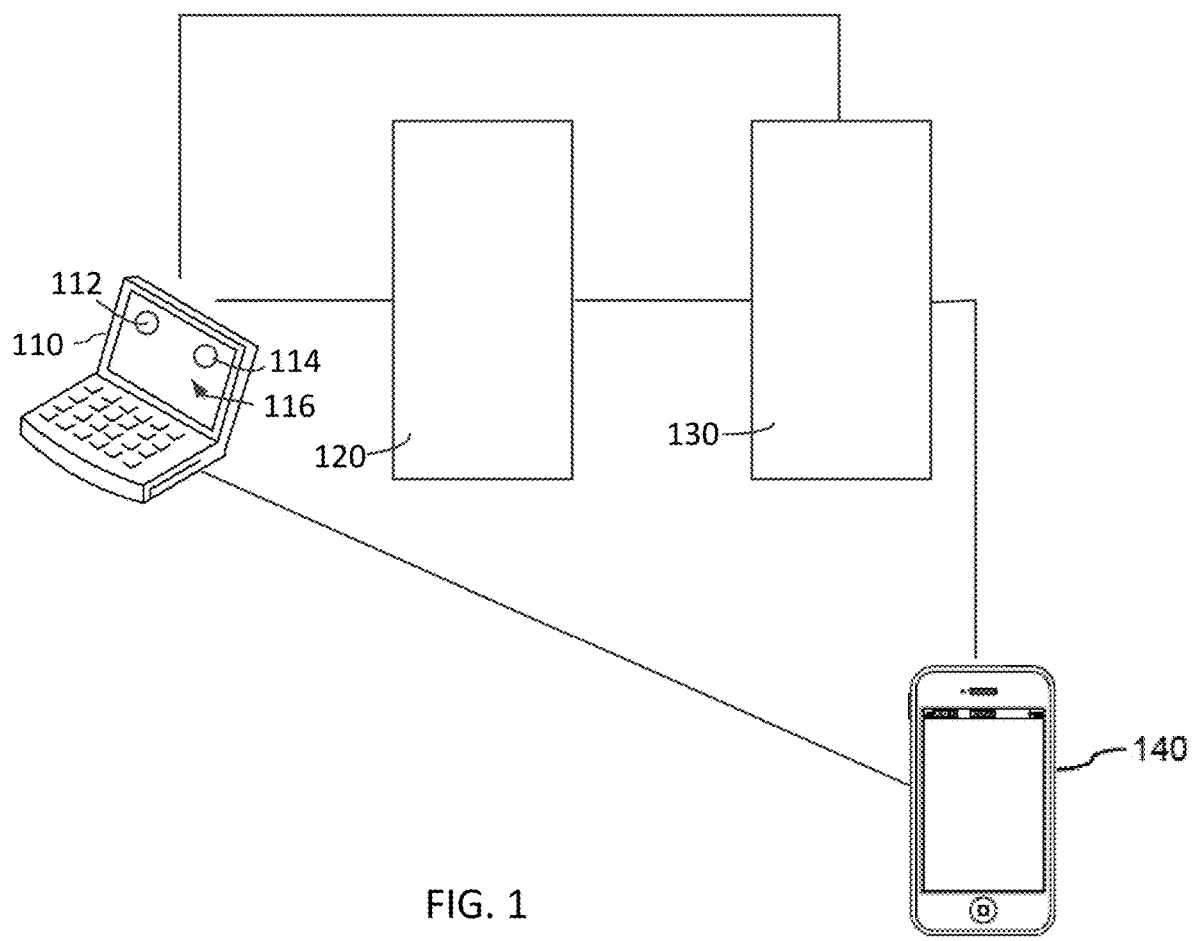
FIG. 1 is a block diagram of an exemplary system and features, consistent with certain aspects related to the innovations herein.

FIG. 1 illustrates a block diagram of an exemplary system and system features, consistent with certain aspects related to the innovations herein. In the illustrated embodiment, an environment is shown that includes: a first computing device 110, a web server 120, a synchronization server 130 and a secondary computing device 140. The first computing device 110 may be a computing device associated with a user. The first computing device 110 can be a computing device such as a laptop computer, a tablet computer, a smart phone or the like. The first computing device 110 can communicate with a web server 120. The web server 120 or the first computing device 110 can communicate with a synchronization server 130 which communicates with the second computing device 140. The second computing device 140 may be a mobile computing device associated or "related" with the first user, such as a smart phone, a smart watch, a television, a television within location proximity to the user or the user's first computing device, a computer or any other computing device.

The user may enable the synchronization functionality in various different ways. With reference to FIG. 1, according to exemplary implementations disclosed herein, user activity on the first computing device 110 can include a wide variety of information such as navigation to web URL and particular data (e.g., GPS, a cursor position on screen of first device) or actions of users may be provided (e.g., as "URL1") to the web server 120. Such a web server 120 may enable the synchronization processing set forth herein, such as via site-wide scripts or by manual generation based on user action (e.g., inclusion of Website functionality or plug-ins involving a "sync this" button 112 or a "Send to Phone" button 114 that can be actuated with a cursor 116).

In other embodiments, the user may enable the synchronization functionality by downloading a synchronization program to the first or the second computing device, or both. In one embodiment, the synchronization program can be a separate program or an extension or plug in that is added to a web browser program running on the first computer device. In some implementations, the synchronization signal may be automatically generated as a function of features of an App, a GPS signal, a website URL, sensor signals or other signal inputs. However, implementations herein are not limited to this particular example shown, but instead may encompass a large variety of devices or any behavior or functionality that a user may synchronize.

When the synchronization feature is enabled, the inventive system can synchronize content, data or information among multiple computing devices. In the illustrated embodiment, the synchronization server 130 can be in communication with a first computing device 110 and a second computing device 140. The synchronization server 140 can include a user database that stores information about each of the system users. This information can include information about each user, such as login identification, multiple computing devices associated or "related" with that user (which, in this example, can include the first computing device 110 and second computing device 140). The stored user database information can also include resources in many other computing devices that are operated by the same or other users (e.g., data or sensors available on each device).

The user may use the first computing device 110 to access a web server by inputting a URL to a web browser program on the first computing device 110. The URL can be transmitted to the web server 120 that can respond by transmitting a web page associated with the URL to the first computing device 110, which is then displayed on the first computing device 110. If the first computing device has the synchronization software running, the first computer device 110 can also transmit a first synchronization signal to the synchronization server 130. The synchronization server can respond by mapping the first synchronization signal to different synchronization signals corresponding to the user's related devices. This mapping can help the synchronization server 130 determine a second synchronization signal that is sent to second computing device 140, as well as the suitable synchronization signals that can be sent to other devices.

The mapping process can include determining which devices are "on-line" or "off-line." In one embodiment, a process facilitated by the extensible messaging and presence protocol (XMPP) allows the synchronization server 140 to communicate with the user devices and determine if each device is on-line or off-line. For example, in one embodiment, the synchronization server can be a XMPP synchronization server that communicates with an XMPP user database. Each user can have his or her own unique entity within the XMPP database, for example: 123@getdoublevision.com. Each computing device associated with the user can have its own unique suffix that is added to the entity (e.g., the full identifier for the device can be, "123@getdoublevision.com/456," where "456" is the suffix that identifies a specific computing device associated with the user). All of the user's computing devices, including "related" devices, can be reached at the address 123@getdoublevision.com. "Related" devices may include, for example, devices within location proximity to the user or the GPS location from the user's devices, or devices belonging to friends of the user.

Whenever a new user's computing device comes on-line, it sends a "hello" message to 123@getdoublevision.com. This hello message is received by all of the user's computing devices that are also online at that moment, as well as the XMPP synchronization server. The other devices and the XMPP synchronization server can also send a "hello" message back to the new computing device, so that the new computing device will also have a list of all of the user's devices that are online. Thus, all of the user's online devices and the XMPP synchronization server maintain the online status of the user's computing devices at any time. Whenever a user's computing device goes offline, the XMPP synchronization server sends a "presence status" signal to all of the user's other online computing devices. The user's other online devices will then remove the computing device that just went offline from their respective online lists. In one embodiment, whenever a user's computing device needs to send data or synchronization signal to any of the user's other computing devices (i.e., "related" devices), the sending device will check in its online list to see if there are any other devices online (except itself). If no other devices are online, the computing device will send the request to the XMPP synchronization server and the XMPP synchronization server may send a notification message to the other devices as determined by the synchronization server. For example, if a device is offline, the notification message will be sent through Apple's push notification servers to Apple devices, an email, an SMS or another notification to the offline device, so that the user can be informed to bring one or more of the other computing devices on-line. If there are other user devices that are online, the first user computing device will send the message to all other online devices that share the same unique entity prefix. In other embodiments, the online or offline status of the user's devices can be determined by other methods. If a device is off line, the synchronization server 140 can send a push message to the device asking the user to turn on the application. In other embodiments, the system will determine an alternative way to reach or notify users. For example, the notifications may include messaging a push server or sending an email, SMS text message, or hand-off which is Apple Computer's version for notifying users on other user Apple devices. The user or a second computing device can respond to these notifications by running a synchronization application or by viewing or opening the notification message in a browser which can display synchronization signal.

When the on-line devices are determined, the synchronization server 130 can perform the mapping processing. The mapping may also occur on the first or the second device, or the mapping may be downloaded on the devices and can be updated by the synchronization server. In one embodiment, the mapping processing can be illustrated with reference to Table 1. The mapping process is performed as a function of the input or the synchronization signal. In some implementations, the mapping process can include a default configuration that generates a mapped output signal that is an identical copy of the input signal. However, such output signals may also map to related or unrelated content as well, such as a specific mapping for a client-side app. Moreover, the synchronization server may apply additional logic and mapping, or saving or updating the mapping on each device e.g., so as to minimize frequency of automatically or manually synchronized signals based on many settings, such as user preferences for the desired synchronization.

TABLE 1

| Device 1<br>Computer | Device 2<br>Smart Phone | Device 3<br>Tablet | Device 4<br>Smart Watch | Device N |
|---|---|---|---|---|
| URL1 | Mobile URL1 | JPG1 | GPS1 | Thermal Sensor |
| URL1 + cursor movement | URL2 | Fingerprint 1 | Sensor 2 | Motion Sensor |
| GPS2 | GPS3 | JPG2 | Audio 1 | Self-Photo |
| URL3 | Fingerprint 2 | Fingerprint 3 | Audio 2 | E-Ticket |

If the synchronization server 130 receives a first synchronization signal from the first computing device 110, the system can search a mapping database for the corresponding synchronization signals for the other devices. For example, if the first synchronization signal is URL1, the mapping can result in a mobile version of URL1 synchronization signal transmitted to device 2, a JPG1 synchronization signal transmitted to device 3 (where JPG1 can be an image associated or related to URL1) and a GPS1 synchronization signal transmitted to device 4 (where GPS1 can be a GPS location associated or related to URL1). In response to these synchronization signals, the second device (which might be a mobile phone) can display a mobile version of the URL1, the third device (which might be a tablet computer) may display a photograph associated with the URL1 and the fourth device (which may be a smart watch) may download directions from the current GPS location to a location which may be a store associated with URL1.

If the user then moves the cursor to a specific location on the first computing device 110, this interaction can result in a different synchronization signal being transmitted to the synchronization server 140, as illustrated in Table 2. The synchronization server 140 can respond by transmitting URL2 as a synchronization signal to smart phone device 2, actuate a fingerprint sensor on table device 3 and actuate a sensor on smart watch device 4.

In other embodiments, the synchronization signals can be transmitted based upon various triggers. For example, if the first computing device is moved to a specific location, the system can determine that the user is at a trigger location and the first computing device 110 can transmit a GPS position ("GPS2") as a synchronization signal to the synchronization server 130. This location may correspond to a store location that has closed at the current time. The system can respond by outputting another GPS position ("GPS3") which can be the location of another store that is currently open, so that the user can make the necessary purchases. The synchronization server 130 can output a picture ("JPG2") to the tablet device 3 informing the user of the fact that the current location store is closed but the smart phone device 2 has directions to a store that is open. The system can also output an audio signal to the smart watch device 4 that can transmit an audio signal informing the user of the instructions displayed on the tablet device 3.

In some applications, the inventive system can be used for security purposes. For example, if the user accesses a resource at URL3, the resource may require a login with secure user identification verification requirements. The synchronization server can respond by requesting a fingerprint verification from the biometric fingerprint sensor available on a second device (e.g., a smart phone). If the smart phone is not available, the system may request a fingerprint sensor verification from the tablet device 3. The system may also transmit an audio signal to the smart watch device 4 informing the user to bring the smart phone or tablet on line so that the fingerprint sensors can be used by the system; otherwise, a message notification can be sent to the offline devices to remind the user to take action when they view or access the devices.

In some implementations, the mapping may be provided by a mapping service provider, the user, the website owner, or a third-party developer. The mapping does not necessarily need to be directly related to the input signal. According to an alternate mapping processing, the input signal could be the GPS location on a smart phone, which is mapped on the synchronization server to a restaurant location, and then that restaurant's photos are displayed on a corresponding mobile device or smart phone screen (or another screen). Alternatively, another mapping for the same input signal can be for alternative or "related" restaurant locations.

In a representative illustration, the first computing device 110 can be a computer having a web browser program. The first computing device 110 can transmit a URL web address to the web server 120, which can respond to the URL by transmitting a web page back to the first computing device 110. For example, the first computing device 110 can transmit a URL for yahoo.com to the first computing platform 120 web server which can transmit the yahoo web page back to the first computing device 110. Upon initiation of the synchronization process, the user activity may then be transmitted as a first synchronization signal based on the initial screen of the first computing device to the synchronization server 130. At the synchronization server 130, various processing may occur based on the first synchronization signal, including performing processing of the first synchronization signal against a mapping structure (e.g., a mapping table, scheme or information) as a function of data available to the synchronization server 130 or otherwise embodied within the mapping structure. Here, for example, the first synchronization signal may be mapped to appropriate output content, such as content according to the mapping structure or suitable for the second computing device screen. Further processing may be performed at the synchronization server 130 to process and provide the output content for suitable use by the second computing device 140 or display on a second computing device screen.

Moreover, consistent with the present innovation, various synchronization processing may also work in reverse. According to systems and methods herein, a user's interaction with the second computing device 140 (e.g., sensor inputs or touch screen inputs on the screen of the second computing device 140) may be synchronized back to the initial device 110 and screen. In certain implementations, for example, user interaction with the output on the second device 140 is utilized to generate another input signal, which is then sent to the synchronization server where mapping processing occurs, and a corresponding output is sent back to the initial device 110 or screen.

Figure 2:
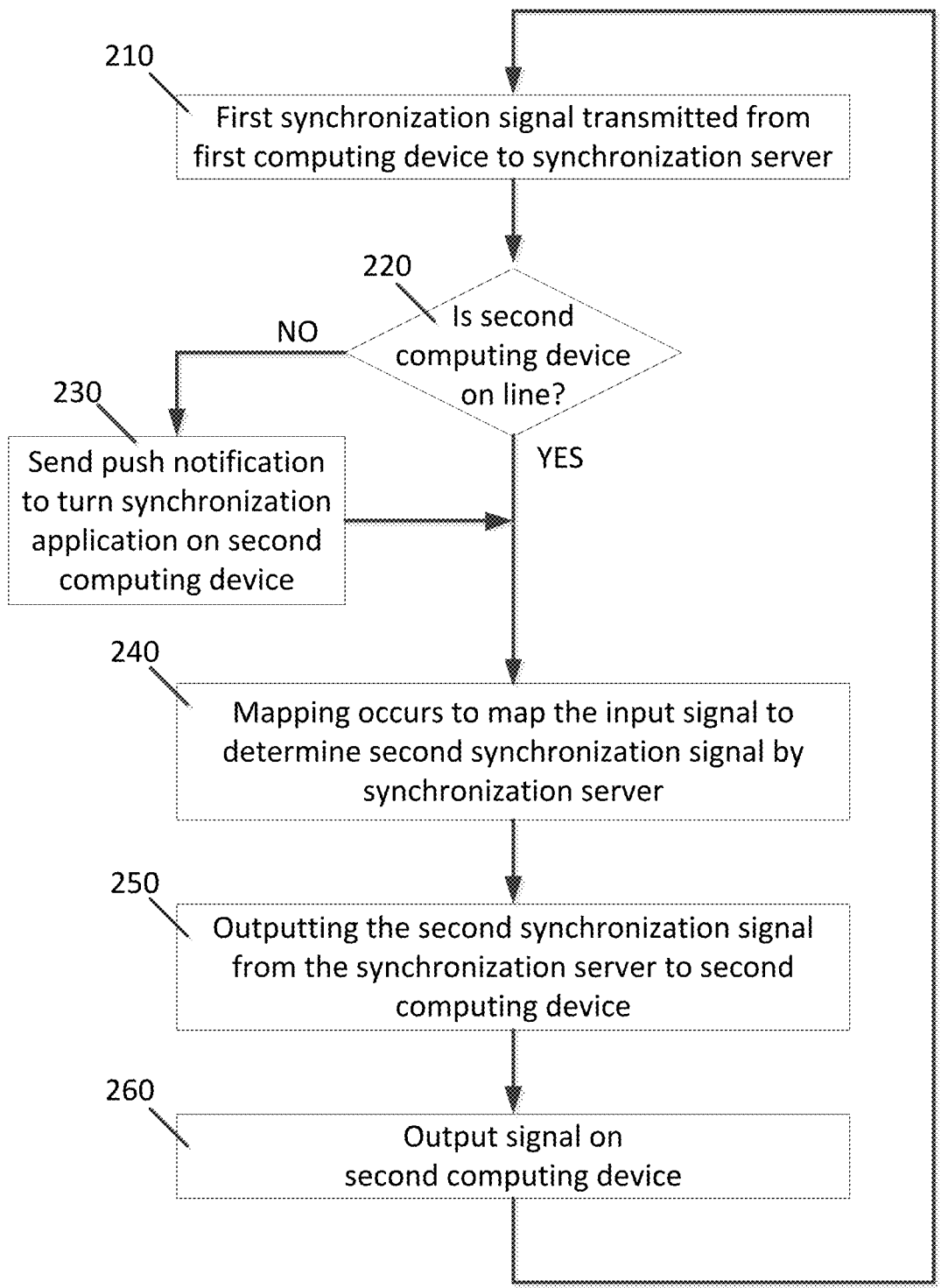
FIG. 2 is a flow diagram illustrating exemplary synchronization and mapping processing, consistent with certain aspects related to the innovations herein.

FIG. 2 is a flow diagram illustrating exemplary synchronization and mapping processing, consistent with certain aspects related to the innovations herein. An action is taken by a user or an event occurs that is configured to initiate a first synchronization signal from the first computing device to the synchronization server 210. The action can be an express action by the user such as inputting a URL into a web browser or automatically in response to a user action, such as movement of a cursor control. In other embodiments, the first synchronization signal may be generated via a browser extension, such as an add-on or plug-in for Chrome, Safari or Firefox via a "Send to Phone" or a "Sync This" button on a developer's webpage, via a site-wide script on a developer's webpage, or via any other detectable triggers that can be based upon user actions, sensor data (e.g., GPS position, time or date, temperature, or data from a gyroscope sensor, a touch-screen sensor or a gesture). All of these actions can result in a first synchronization signal being transmitted to the synchronization server.

The synchronization server can determine which second computing devices are on-line 220. The online status can require a synchronization software application be running on the second computing device. If the second computing device is not on-line, the synchronization server can send a notification message, as determined by the synchronization server to be an Apple Push Notification (or Hand-Off, which is Apple's product for notifying users on other devices) instructing the user to turn on the synchronization software application 230. In other embodiments, the system may determine alternative way to reach or notify users. For example, the notifications may include messaging a push server or sending an email or short message service (SMS) text message or Hand-Off (which is an Apple software product for notifying users on other user devices). The user or the second computing device can respond to these notifications by running the synchronization application, or directly viewing the signal in the default browser, within a native client-app with or without the synchronization developer kit (SDK), or downloading the synchronization app to the device.

The first synchronization signal can then be mapped by the synchronization server, at 240. As explained further above and below, the mapping by the synchronization server may include identifying the first synchronization signal and determining a corresponding synchronization signal for another device. The second synchronization signal is then provided as output, at 250. The second synchronization signal may be provided to the second device 140 via SMS, or via push notification (e.g., from the synchronization application, or a software application running on the second computing device with synchronization software developer kit (SDK)). The second computing device can respond to the second synchronization signal by outputting an output signal. The output signal can be any type of signal output through an output device on the second computing device. For example, the output signal can be a visual signal such as a web page that is output through a visual display of the second computing device. Alternatively, the output signal can be an audio signal that is output through a speaker in the second computing device. The described process can be repeated so that the first synchronization signals are constantly being transmitted from the first computing device to the synchronization server and the second computing device is continuously receiving updated second synchronization signals from the synchronization server and outputting revised output signals based upon the first synchronization signals.

In some embodiments the synchronization process can be automated. One exemplary of automatic sync processing may be understood in connection with a user searching for additional information regarding an establishment, such as a restaurant. With reference to FIG. 1, a user may be utilizing the first computing device 110 to look at a restaurant on Yelp.com. Here, the user clicks through to a specific business web page using a browser program, where the system may be configured such that the Yelp URL to that business page is processed as the automated first synchronization signal. In this example, the user's smartphone may be set up as the second computing device. Further, according to implementations herein, one or more of the following features or sequence of these features may be configured to occur. The system may be configured such that the second computing device 140 runs the synchronization software application, which displays the same Yelp URL (given the default mapping in this example, i.e., display of the same URL via the client-side Sync app). Alternatively, the system may be configured such that the mobile version of the same Yelp URL is displayed on the second computing device 140. Here, for example, the mapping structure may map the URL as the first synchronization signal to a mobile version of the URL as the second synchronization signal for the second computing device 140. The system may also be configured such that a map app or the synchronization application provides an output that displays directions to the business. Here, for example, the mapping structure may utilize mapping to 'deep-link' directions to the business, e.g., in a Maps app. The system may be configured to provide an App Store page and associated link(s) as the output signal, directing the user of the secondary device 140 to download the Yelp app, if needed.

Here, for example, the mapping structure may map the URL to the App Store page for the Yelp app (URL2) suitable for their mobile device, again, as a function of whether or not the user's second computing device 140 is already running the desired app. The system may be configured to provide the Yelp app itself, as the output signal, e.g., to display the same business in the app on the user's smartphone. Here, for example, the mapping structure may utilize mapping to 'deep-link' information of the article in Yelp's app. The system may be configured to provide the Yelp app, itself, specifically display of a checkout page in the app as the output signal. Here, for example, the mapping structure may utilize mapping to 'deep-link' information of the checkout purchase page within Yelp's app. Finally, the system may be configured to provide customized mapping in any other number of scenarios. In one instance, for example, the mapping structure may be utilized to map input signals to output anything including other client-side apps, related or unrelated. Moreover, according to various implementations herein, the input signal may be automatically updated with each URL that the user navigates to, and the secondary screen continues to update as well in real-time, or asynchronously and can serve as notifications or reminders.

User-Directed Synchronization

In an embodiment, the user of the computing devices can control the synchronization process. If a user is reading an article on the website techcrunch.com, and clicks the "Sync This" button placed there by the website developer staff above each article, the 'input' data attached by website developer to the "Sync This" button is the input signal (i.e., likely the URL to that article) and the mobile device is the secondary screen which then automatically displays:

the Sync app itself which displays the same Techcrunch URL (i.e., default mapping—to display URL in clientside Sync app), the mobile version of the same article (i.e., mapped to a mobile version displayed in clientside Sync app), the App Store page to download the Techcrunch app (i.e., mapped to their mobile app, if the user doesn't have the app already), the Techcrunch app itself which displays the same article in the app (i.e., mapped to 'deeplink' the article in Techcrunch's app), the Techcrunch app itself which displays a checkout page in the app (i.e., mapped to a 'deep-link' checkout purchase page in the Techcrunch's app), or any other number of scenarios, input signals can be mapped to output anything, including another clientside app (related or unrelated)

Implementations herein may also include or involve two-way synchronization. For example, all illustrations herein may also work in reverse, where secondary screen and display may become the input signal, which is sent to synchronization servers to be mapped and then sent to an initial screen.

According to another illustrative example, the user can be editing a Word document on a desktop computer ("primary screen" or "primary device"), the user can enable the synchronization with his smart phone ("secondary screen" or "secondary device"), wherein the input is the word document that is mapped to the font controls (output). As such, the user's clicking on font controls (output) sends the appropriate commands to the synchronization server and then mapped to and applied in the word document, and vice versa.

Figure 3:
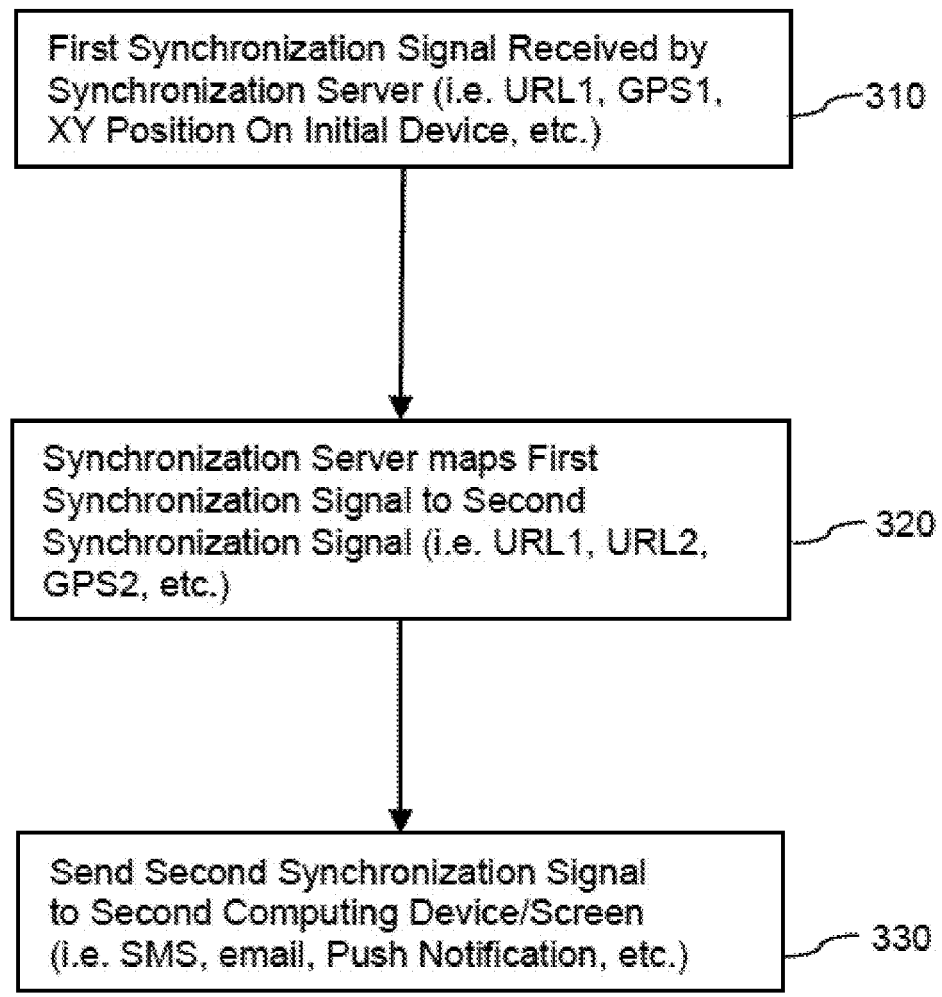
FIG. 3 is a flow diagram illustrating further exemplary synchronization and mapping processing, consistent with certain aspects related to the innovations herein.

FIG. 3 illustrates a flowchart of a further exemplary synchronization and mapping processing, consistent with certain aspects related to the innovations herein. This embodiment illustrates the different types of actions that can be used to automatically trigger the first synchronization signal to the synchronization server 310. The user can input URL1 to a web browser which can trigger the first computing device to transmit URL1 as the first synchronization signal to the synchronization server. Alternatively, the user may go to a specific location which can be detected by a GPS sensor on a first computing device which can trigger the GPS location as the first triggered synchronization signal.

The user interaction with the first computing device may also result in a triggered synchronization signal. For example, a user may move a cursor or touch a specific location on the first computing device display which can cause the first computing device to transmit the X, Y position on the first computing device screen. The user interface can detect the position of the cursor as matching a trigger condition resulting in a first synchronization signal being transmitted to the synchronization server. In other embodiments, any other sensor signals or user actions can be used to trigger the transmission of the first synchronization signal to the synchronization server.

The synchronization server maps the first synchronization signal to a second synchronization signal 320. The synchronization server may access user data and identify the computing devices that are associated or "related" with the user. The mapping functionality can be represented by a table, such as Table 1 above. The mapping table can inform the synchronization server what the second output synchronization signal should be transmitted to the other computing devices. The synchronization server can search the first column of the table and identify the matching first synchronization signal. From the first synchronization signal in the first column, the corresponding second synchronization signals are aligned and listed horizontally. As discussed earlier, the second synchronization signals can be the same or different types of signals. For example, a first synchronization signal that is a URL, can result in a second synchronization signal that can also be a different URL or any other type of signal, such as a picture ("JPG"), GPS or a Sensor request. The mapping can be configured by user preferences, web server preferences (e.g., developer preferences), the synchronization server or even locally on the device which can update the synchronization server or be updated by it as well.

Once the mapping has been performed and a second computing device has been identified, the system can transmit the second synchronization signal to the second computing device 330. The second synchronization signal can be transmitted through various mechanisms including: SMS, email, push notifications, or directly to the Sync app/SDK, if the device is "online," for example. The second synchronization signal can include output information or data as well as the output device on the second computing device. The second computing device can run a synchronization application that can interpret the second synchronization signal and produce an output signal based upon the second synchronization signal. For example, URL1 can result in the second computing device browser displaying the corresponding mapped URL2.

In other embodiments, a second synchronization signal can result in the JPG1 image being displayed (which may be related or associated with URL1, or possibly completely unrelated). Alternatively, a GPS second synchronization signal can result in the directions to the GPS location being displayed. An audio second synchronization signal can result in the second computing device emitting the audio output signal.

Figure 4:
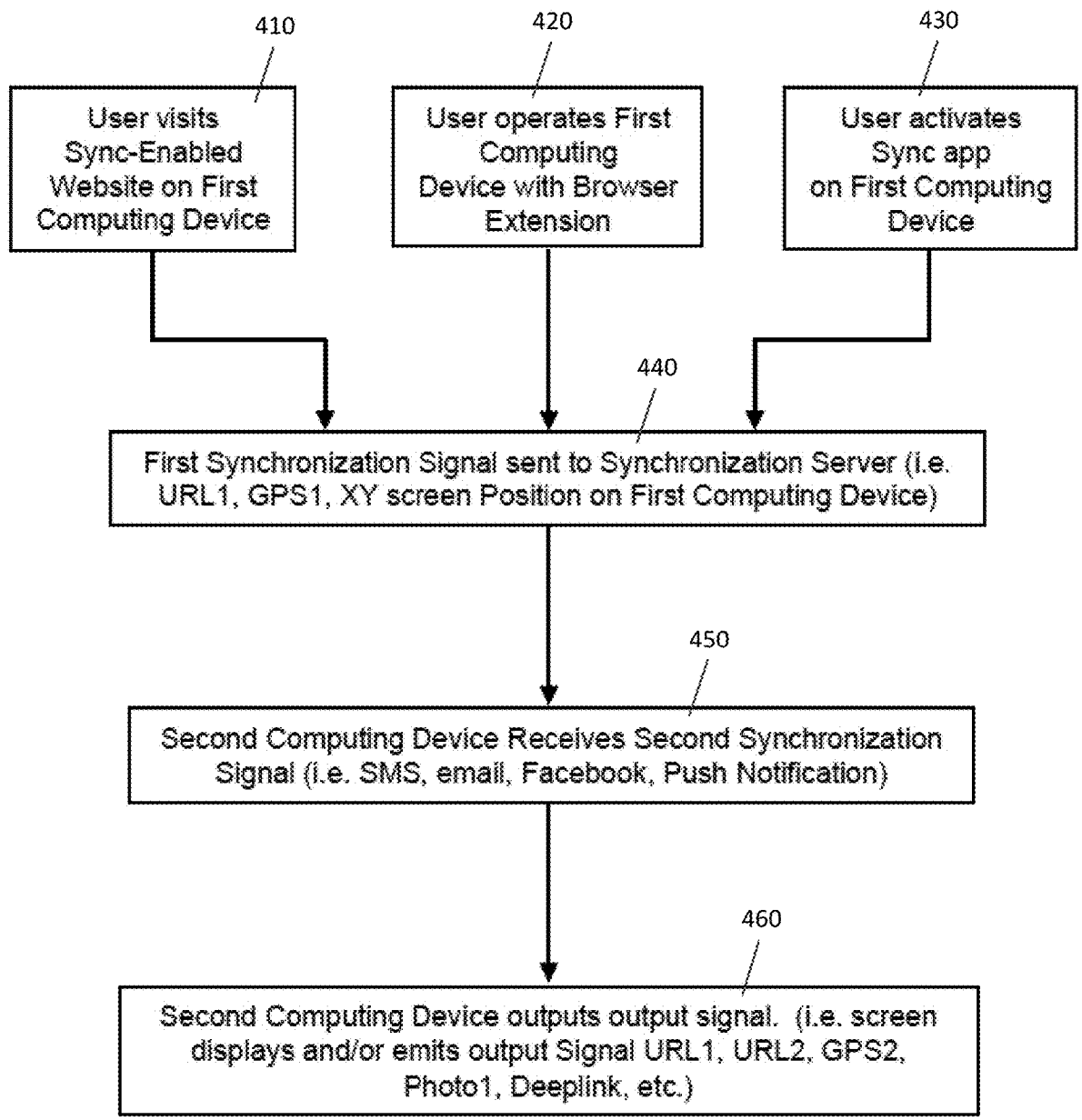
FIG. 4 is a flow diagram illustrating additional exemplary synchronization and mapping processing, consistent with certain aspects related to the innovations herein.

With reference to FIG. 4 a flowchart is illustrated showing additional exemplary synchronization and mapping processing, consistent with certain aspects related to the innovations herein. The flowchart illustrates various initial steps 410, 420 and 430 for actuating the synchronization process. In a first example, a user can use a first computing device with a browser program to visit a synchronization-enabled website 410. In a second example, a first computing device can have a web browser that includes a synchronization browser extension that can automatically send a first synchronization signal from the first computing device to the synchronization server based upon user interaction with the web browser or sensor signals from the first computing device 420. In a third example, the first computing device can run a synchronization application that can automatically send a first synchronization signal from the first computing device to the synchronization server based upon user interaction or sensor signals detected by the first computing device 430.

Any of these steps 410, 420 and 430 can cause the first synchronization signal to be sent to the synchronization server 440. As discussed, the first synchronization signal can include a URL, a GPS, a X-Y cursor position, or any other information or data that can be used or mapped by the synchronization server. The synchronization server maps the first synchronization signal and transmits a second synchronization signal to a second computing device. 450. The second computing device receives the second synchronization signal 460 which can be in the form of a SMS, an email, a Facebook notification, an Apple push notification, a Google Android push notification, or a directly to Sync app, if the device is "online.". The second computing device can then process the second synchronization signal and output a corresponding output signal 460. For example, if the second synchronization signal includes a URL, a web browser on the second computing device can display the web page associated with the URL. If the second synchronization signal includes GPS data, the second computing device can output directions to the GPS location. If the second synchronization signal includes a photograph, the second computer device can display the photograph.

The described systems and methods can relay information from the user's initial screen on a first computer device to the synchronization servers, map that information, and sends an associated output to the secondary screen or other output devices on a second computing device. Further, according to implementations specific to Apple mobile devices (such as iPhone, iPod Touch, iPad), Apple's "Push Notifications" may be the functionality used to "send" the notification message with synchronized content or data to the secondary device/screen. Further, implementations of the Apple Push Notification system may alert the user if the synchronization app isn't already running on the computing device. The push notification can inform a user that there's an action to take (e.g., downloading or opening the synchronization application to view or access the synchronized content/data) or if the synchronization application is open and running then automatically display the desired related information or data.

Browser Extensions

With respect to implementations directed to a user browsing the web, a plugin extension to a browser may be utilized in order to automatically generate the input signal. After installing the extension, the plugin may be configured to ask the user (once) for login information, such as their mobile-side app login and mobile phone number, Facebook login, or email, a login for any mobile-side app that uses the sync SDK, or the like. The user's data is then sent to the synchronization servers, which can then send an SMS text message or email to the user's mobile device with the sync signal which can be a link to download a mobile app, or the web server developer's own mobile app but with an embedded or provided SDK enabling the client-side synchronization. From then on, systems and methods herein may maintain a mapping between the user's browser session ("initial screen" or "initial device") and the user's mobile device ("secondary screen" or "secondary device"). Here, for example each time the Chrome Extension detects a change in the URL or change in which a browser tab is currently active, it sends that current URL to a synchronization server (as the input signal), then the synchronization server perform any necessary mapping and send that information or data to the client-side mobile Sync app (or website's own mobile app with the sync SDK, which enables the client-side synchronization). Matching extensions are created for the other browsers (e.g. Firefox, Safari, and Internet Explorer) as well.

Client Site-Wide Script

The browser implementations above may require users to have explicitly downloaded and installed the appropriate extension for their browser, which websites can't count on. Accordingly, other implementations may be utilized wherein a webpage script (i.e., a small amount of JavaScript code) may be embedded into their webpages to enable Sync by automatically generating the input signal based on the URL the user is viewing or other signals generated by the developer, which is then sent to the synchronization servers. Again, such script can send any input signal as defined by the developer to be the current URL and additional information or data about the user e.g., X-Y screen position, user data like name) to the synchronization servers (as the input signal). Websites will have the ability to specify desired mappings between the input signal and the desired content or behavior (output signal) that is then displayed on the user's secondary screen Client "Sync This"/"Send to Phone" Button When more information than just the current URL is required for the input signal, websites can integrate an embeddable button-widget, similar to Facebook's "Like This" button. The "Sync This"/"Send to Phone" button can be easily set up to send the desired content/data to the synchronization servers (as input signal) when the user clicks on it.

For example, eBay.com shows many products on each page but by adding the "Sync This" button next to each product, users can click the specific product they wish to synchronize to their secondary screens. Each "Sync This" button has its own input signal and mapping (specified by webpage developer), so the "Sync This" button above Product_1 can map to display the mobile version of the Product_1's URL on the second device, while another button above Product_2 can map to display the purchase checkout page on the second device, or can map to an display image from Product_2 on the second device. The configuration of the "Sync This" actuation and other mapping functionality and processing can depend on the predetermined mapping configuration used by website developer or mapping service provider.

Service Running in Background

In addition to the extensions for all major web browsers, an embodiment of the present invention can also include a synchronization service that runs in the background of the initial screen, which requires the user to install the service on the initial screen (App on iOS, Mac App on OSX, .exe program on Windows, or third-Party Apps with Sync SDK). In one embodiment, the synchronization service provides an API for developers to integrate their own app specific commands (mappings), without dealing with communication between the initial screen and the secondary screen. This synchronization service can provide the communication between the initial screen and the secondary screen sync device.

In one embodiment, the Client Site-Wide Script and the "Sync This"/"Send to Phone" button can identify the user and encourage the user to download the client-side Sync app (or to use an app which includes a client-side SDK enabling the sync) to the second computing device. In one embodiment, the synchronization system may have a registration process that can ask for a user's personal and device identifications and mobile phone number which can be stored in the user database on the synchronization server. However, In one embodiment, before requesting the user's phone number and sending an SMS text message with a link to the client-side app, implementations herein may be configured to try to identify other mobile computing devices on his local area network or possibly connected via Bluetooth or iBeacon and send them a Push Notification to see if they already have the synchronization client-side app installed.

If a user doesn't wish to provide a mobile number (or is using an iPod Touch or iPad without a "phone number"), an alternative way is required to send the download link for the synchronization client-side Sync app to the user's mobile device. Several alternatives include: providing very short and easy-to-type download URL, and sending a Sync app download URL via email, Facebook, Twitter, or SMS. This user information can then be stored in the user database on the sync server.

Figure 5:
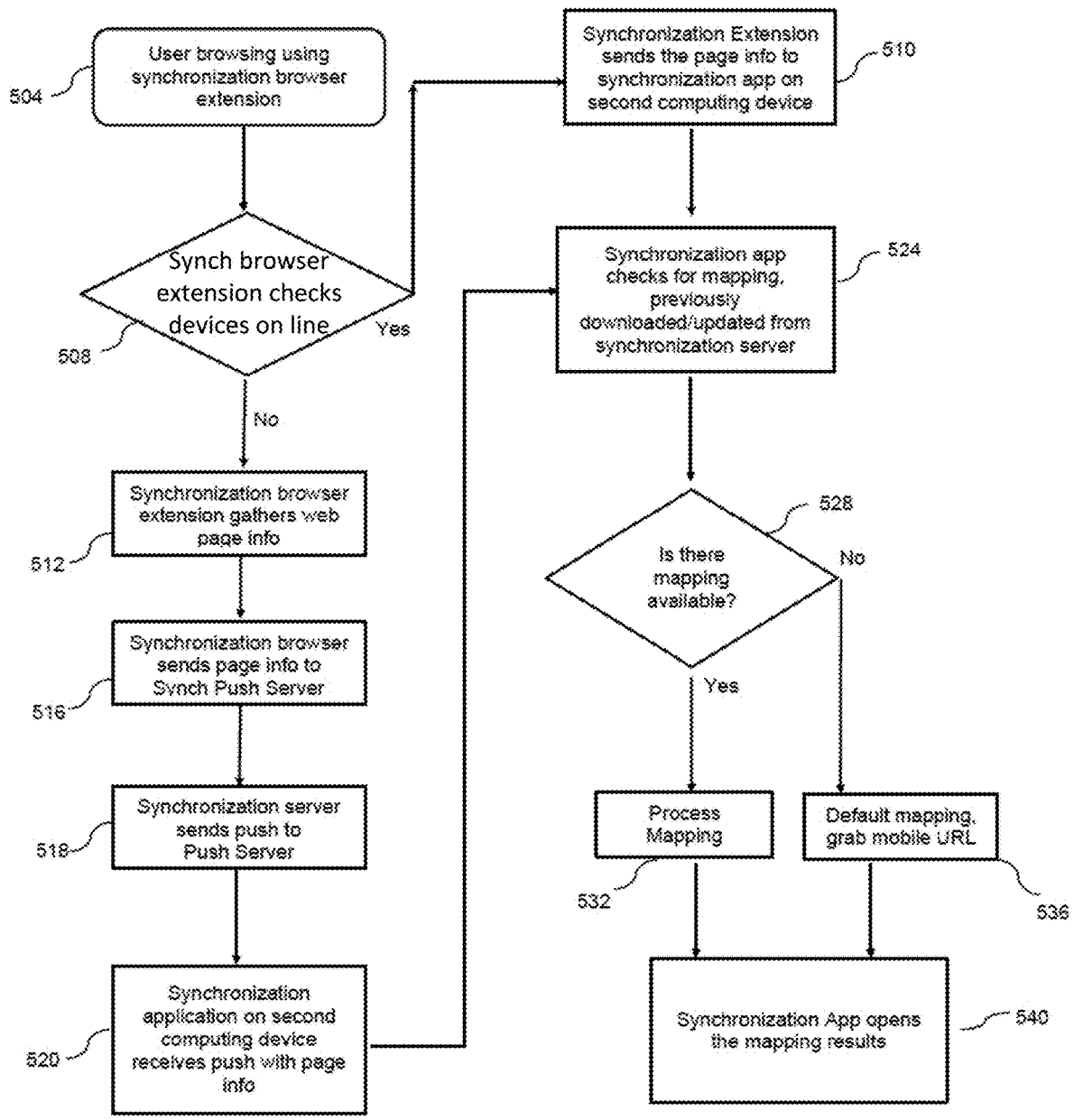
FIG. 5 is a flow diagram of illustrative synchronization and mapping processing for an exemplary URL-URL implementation, consistent with certain aspects related to the innovations herein.

With reference to FIG. 5 a flow chart is illustrated showing an embodiment of device synchronization and mapping processing for an exemplary first URL on a first computing device in synchronization with a second URL on a second computing device. A user can be operating a first computing device having a web browser program that includes a synchronization extension 504. In this embodiment, the synchronization browser can determine which of the other user's computing devices or "related" devices are online 508 as described above. If another computing device is detected to be online, the synchronization extension on the first computing device can send the web page information to the synchronization application on the second computing device 510.

If no other user associated computing devices is online, the synchronization browser extension can gather information and data based upon the current web page that the user is viewing on the first computing device 512. In one embodiment, the synchronization browser extension can send the page information or other data to the synchronization push server 516. Alternatively, the page information or other data can be sent from the first computing device to the synchronization server and the synchronization server can send the page information or other data to the synchronization push server. The synchronization push server can send a push message or signal to any and all of the second computing devices 518. The push signal can cause a second computing device to go online if the user opens or responds to the push message. The synchronization application on each second computing device can receive the push signal with the page information and additional data from the first computing device 520.

From step 510 or step 520, the synchronization application can check for mapping previously downloaded or updated from the synchronization server 524. The synchronization application can also determine if any mapping for the first synchronization signal is available 528. If mapping is available, the synchronization application can perform the mapping of the first synchronization signal to produce a second synchronization signal 532. Alternatively, the mapping of the first synchronization signal to produce a second synchronization signal can be performed by the synchronization server. If mapping for the first synchronization signal which can be a URL is not available, the application program may apply a default mapping procedure where the second computing device is a smart phone and the second synchronization signal is mapped by default to a mobile version of the URL 536. The synchronization application on the second computing device can then open the second synchronization signal from the mapping results and produce an output signal corresponding to the mapped second synchronization signal 540. For example, if the second synchronization signal is a mobile URL, the second computing device can display the mobile URL.

Figure 6:
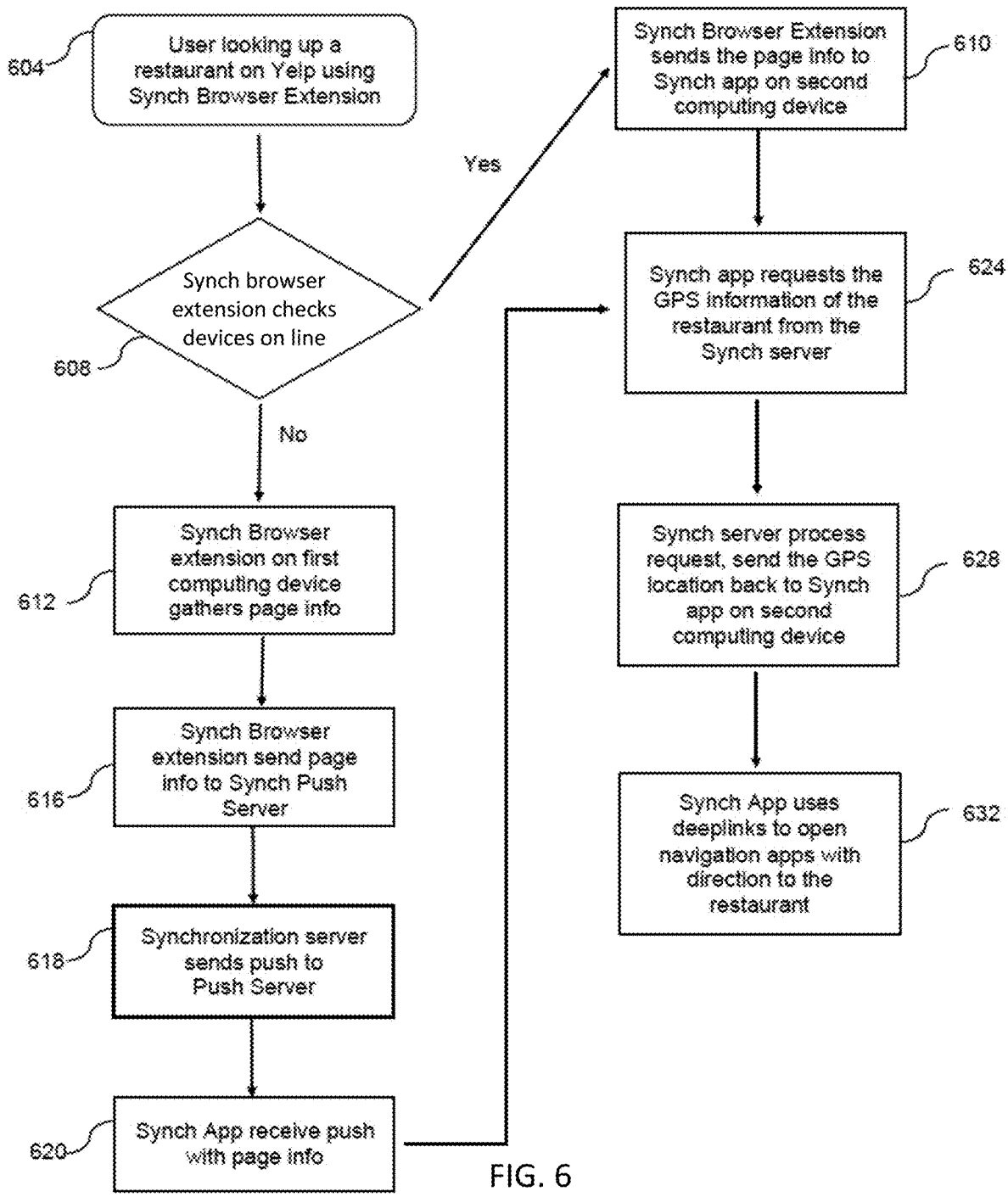
FIG. 6 is a flow diagram of illustrative synchronization and mapping processing for an exemplary URL-GPS implementation, consistent with certain aspects related to the innovations herein.

FIG. 6 illustrates another example of a flowchart of a possible synchronization and mapping process in a URL-GPS implementation. In this example, the user may be using a first computing device with a web browser having the synchronization extension to look up a restaurant on a restaurant review website 604. The synchronization browser extension can check for other user devices or "related" devices that are online 608. If another user or "related" online device is detected, the synchronization browser extension can send the restaurant review web page information to the synchronization application on the second computing device 610. This information or data can include data or link to the specific restaurant that is being seen by the user thorough the restaurant review website on the first device.

If no other user associated computing devices are online, the synchronization browser extension can gather web page information and other data based upon the current web page that the user is viewing on the first computing device 612. In one embodiment, the synchronization browser extension can send the page information and data to the sync push server 616. The synchronization push server can send a push message or signal to any and all of the second computing devices 618. The push signal can cause the second computing device to go online. The synchronization application on the second computing device can receive the push signal with the page information and data from the first computing device 620.

From step 610 or step 620, the synchronization application on each second computing device can request a GPS location from the synchronization server 624. The synchronization server can process the request and send the GPS location information which can include deep-links to the synchronization application (or a third-party application with Sync SDK) on the second computing device 628 (alternatively, if the GPS location is not available, the sync server can request GPS as another input signal going to the chrome extension or webserver (if they have integrated the Sync site-wide script). The synchronization application can receive the deep-links and use the deep-links to open a Maps or Navigation application on the second computing device which provides directions to the restaurant to the user 632 (or take user to download the Maps/Navigation apps if they do not exist on the second device).

Figure 7:
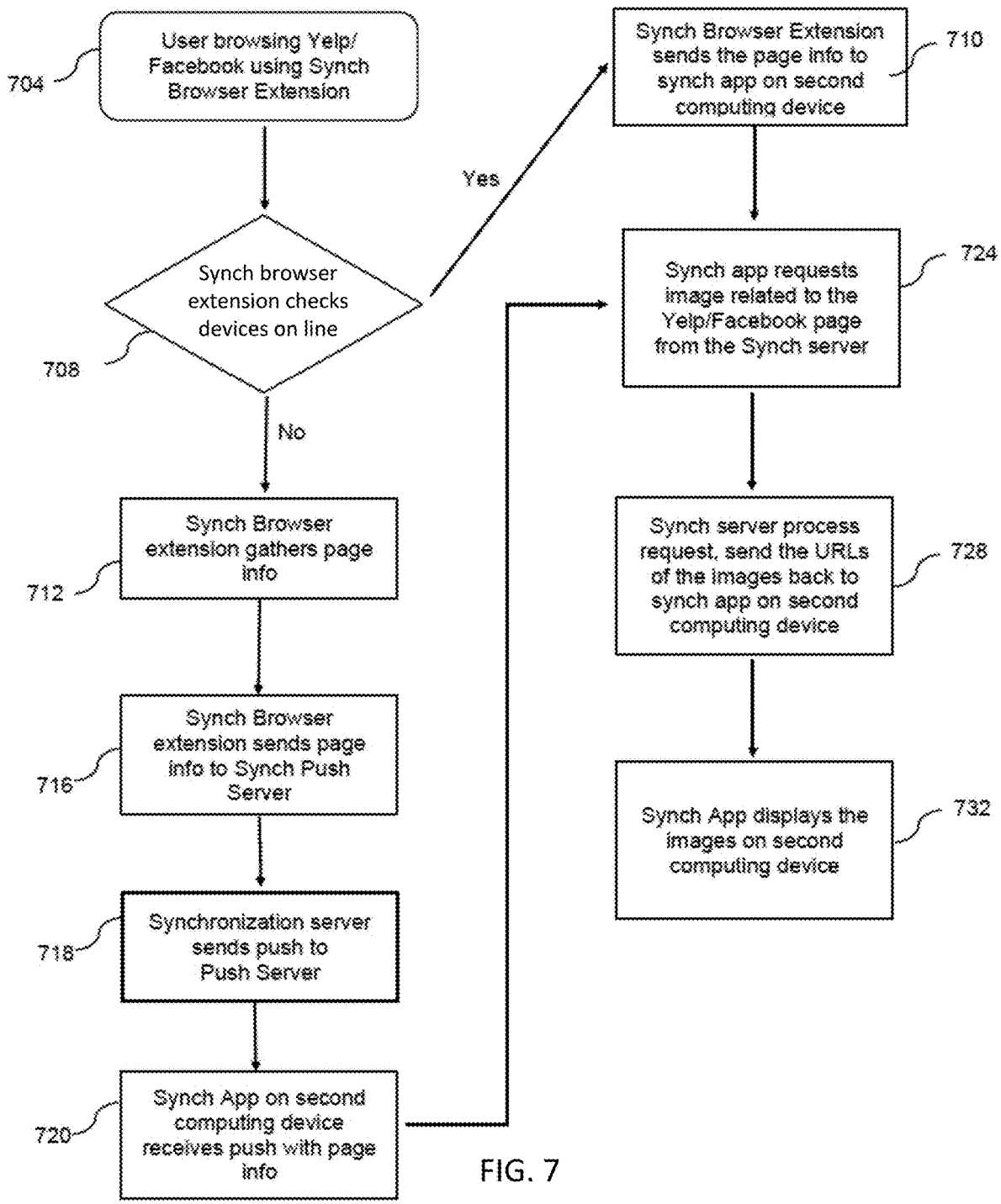
FIG. 7 is a flow diagram of illustrative synchronization and mapping processing for an exemplary URL-JPG implementation, consistent with certain aspects of the innovations herein.
Figure 8:
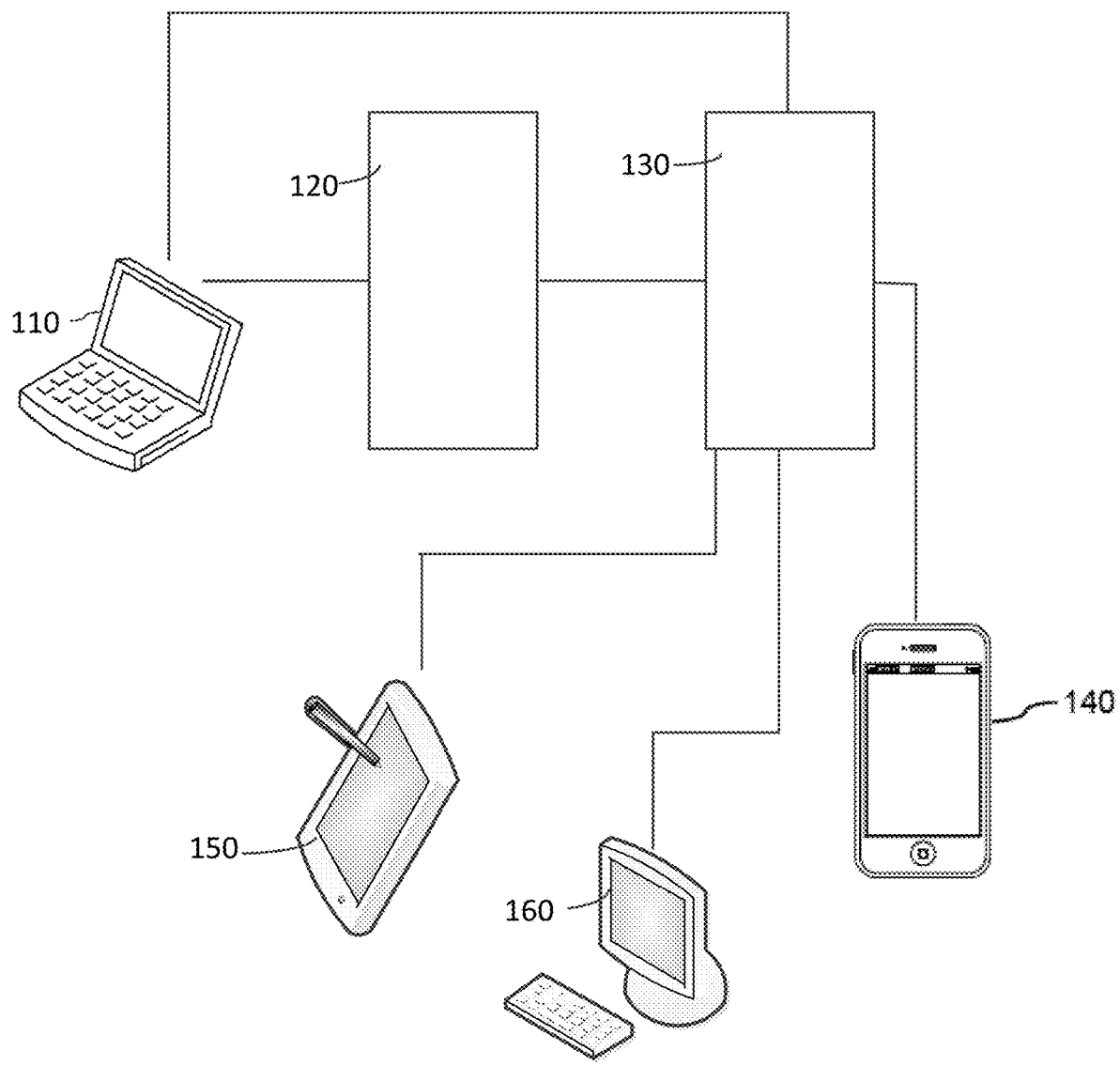
FIG. 8 is a block diagram of another exemplary system and features, consistent with certain aspects related to the innovations herein.

FIG. 7 illustrates a flow chart for synchronization and mapping processing for an exemplary URL-JPG implementation. In this embodiment, the user can be viewing a website with a browser having the synchronization extension 704. In this example, the user may be viewing a webpage from Yelp or Facebook. The synchronization extension running on the browser can check for other user devices that are online. If other user online devices are detected, the synchronization browser extension can send the Yelp or Facebook web page information to the synchronization application on the second computing device 710.

FIG. 7 illustrates a flow chart for synchronization and mapping processing for an exemplary URL-JPG implementation. In this embodiment, the user can be viewing a website with a browser having the synchronization extension 704. In this example, the user may be viewing a webpage from Yelp or Facebook. The synchronization extension running on the browser can check for other user devices that are online. If other user online devices are detected, the synchronization browser extension can send the Yelp or Facebook web page information or data to the synchronization application on the second computing device 710.

If no other user associated computing devices are online, the synchronization browser extension can gather web page information based upon the current web page that the user is viewing on the first computing device 712. In one embodiment, the synchronization browser extension of the first computing device can send the page information and additional data to a synchronization server which can then send this information to the sync push server 716. The synchronization push server can send a push message or signal to any or all of the second computing devices 718. The push signal can cause the second computing device to go online if users open the push notification message. The synchronization application on the second computing device can receive the push signal with the page information from the first computing device 720.

From step 710 or 720, the synchronization application can request an image related to the Yelp or Facebook webpage from the synchronization server 724. The synchronization server can process the request and send URLs for the images as second synchronization signals back to the synchronization application on the second computing device 728. Alternatively, the synchronization server can send the actual images possibly in JPG format back to the synchronization application (or the URL of the image(s)). The synchronization application (or a third-party application with the Sync SDK) can process the URLs or JPGs and display the images on the second computing device 732.

In other embodiments, the inventive system can be used to synchronize information or data on multiple computing devices to improve the functionality and user experience. In one example, a first synchronization signal from the first computing device can be a document that a user is producing using a computer program. In this embodiment, the first document synchronization signal can be mapped to the same second document synchronization signal. Thus, the first synchronization signal can be the same document as the second synchronization signal. This can be useful when a user is working on a document on multiple computing devices 110, 140, 150, and 160. For example, if a user is working on a text document using a word processing program on the first computing device 110, the first synchronization signal can be the text that is being added and edited by the user within the document. The first synchronization signal can be the input text which is mapped to a second synchronization signal that is the same input text. The second computing device 140 can respond to the second synchronization signal by opening the input text in a native program. For example, if the second computing device 140 has the same or a mobile version of the word processing program used to create the input text on the first computing device 110, the second computing device 140 can display the input text in the word processing program running on the second computing device 140. The first synchronization signals can be transmitted whenever text is added, deleted or edited. Thus, the revised input text can be immediately displayed, as it is being input and edited on the second computing device 140. Thus, the user can then switch from working on the document on the first computing device 110 to using the second computing device 140 to continue to work on the text document. Alternatively, the synchronization signal can also be the plain-text and formatting data that make up the text document, so the developer can rebuild the document on the secondary device or keep track of its state, version and any additional data that make up the "text document" in its entirety.

When changes are made to the text document by the second computing device 140, the described process can be repeated in reverse. The second computing device 140 can emit the text document as a third synchronization signal. Mapping can occur that transmits the edited text document as a forth synchronization signal which is transmitted back to the first computing device 110. Again, the mapping can occur at a synchronization server 130 or on the first computing device 110 or the second computing device 140. The text can be displayed on the first computing device 110 as it is input, deleted or edited on the second computing device 140. Thus, the synchronization signals can be transmitted back and forth between the first and second computing devices as the user operates the first and second computing devices 110, 140.

In yet another embodiment, three or more computing devices can be used for the described process. In this example, the mapping of input text from the first computing device 110 can be transmitted to two additional user computing devices 140, 150 and 160 (or "related" devices). In this embodiment, the system can determine the other computing devices 140, 150, and 160 that are online and the mapping can be the input text to all other computing devices, as represented by Table 2 below.

TABLE 2

| Device 1 | Device 2 | Device 3 | Device 4 | Device N |
|---|---|---|---|---|
| Laptop | Smart Phone | Tablet | Desk Computer | . . . |
| text + data | text + data | text + data | text + data | text + data |

When text is input, the first computing device 110 can transmit the text as the first synchronization signal to all of the other computing devices 140, 150 and 160 (Device 2-Device N). The other computing devices 140, 150 and 160 can display the text and data as it is input and the user can then work on the same input text and data through any of the other computing devices 140, 150 and 160. This can allow continuous updating and refreshing of information, so that all text input through any of the computing devices 110, 140, 150 and 160 is constantly synchronized with each other.

In some embodiments, the first and second computing devices can have different sensors or components that can provide enhanced functionality when the computing devices are used together. For example, many smart phones now have fingerprint sensors that are used to prevent unauthorized use of the smart phone or access to stored data. In one embodiment of the present invention, the fingerprint sensor on the smart phone can be used as a security mechanism for a separate computing device. In one embodiment, the inventive system can be configured with a computer as a first computing device and a smart phone with a fingerprint sensor as a second computing device. The first computing device may access the user's private information through a website. The first synchronization signal from the first computing device can be the URL for a login page of the private information website. The URL can be mapped to a second synchronization signal that can be a fingerprint sensor prompt to the smart phone. As discussed, the mapping can be done by a synchronization server or, alternatively, by the first or second computing device. The smart phone can respond to the second synchronization signal by displaying instructions for the user to touch the fingerprint sensor to complete the login of the user to the private information website on the first computing device. The user can then touch the fingerprint sensor and the second computing device can compare the input fingerprint to the stored fingerprint for the user. If there is a match, the second computing device transmits a confirmation third synchronization signal to the first computing device and the user is granted access to the private information through the website on the first computing device. Alternatively, if the fingerprint does not match, the second computing device can inform the user to try again or that the fingerprint is not a match and transmit the fingerprint mismatch message as the third synchronization signal to the first computing device.

This described fingerprint sensor system can be used for various other first computing device applications. For example, in an embodiment when a user first logs onto the first computing device, this login can be the first synchronization signal. The system can respond by transmitting the first synchronization signal to the second computing device that can be a smart phone that includes the fingerprint sensor. The smart phone can respond to the second synchronization signal by displaying instructions for the user to touch the fingerprint sensor to complete the login on the first computing device. If the smart phone confirms that the fingerprint is a match, it will send a print match confirmation as the third synchronization signal to the first computing device which will complete the user login on the first computing device (and possibly on the smart phone as well, if the developer chooses to map it as such). If the fingerprint sensor input does not match the stored fingerprint the second computing device can send a rejection signal to the first computing device to block the user login on the first computing device.

In other embodiments, the system may require information (e.g., a password, a personal identification number "PIN" or any other security information) in addition to the fingerprint confirmation to complete the login process. Thus, the second computing device can transmit a fingerprint match confirmation and the user's PIN or login/password as the third synchronization signal to the first computing device. The first computing device can complete the login if the first computing device determines that the PIN information provided is also a match.

Figure 9:
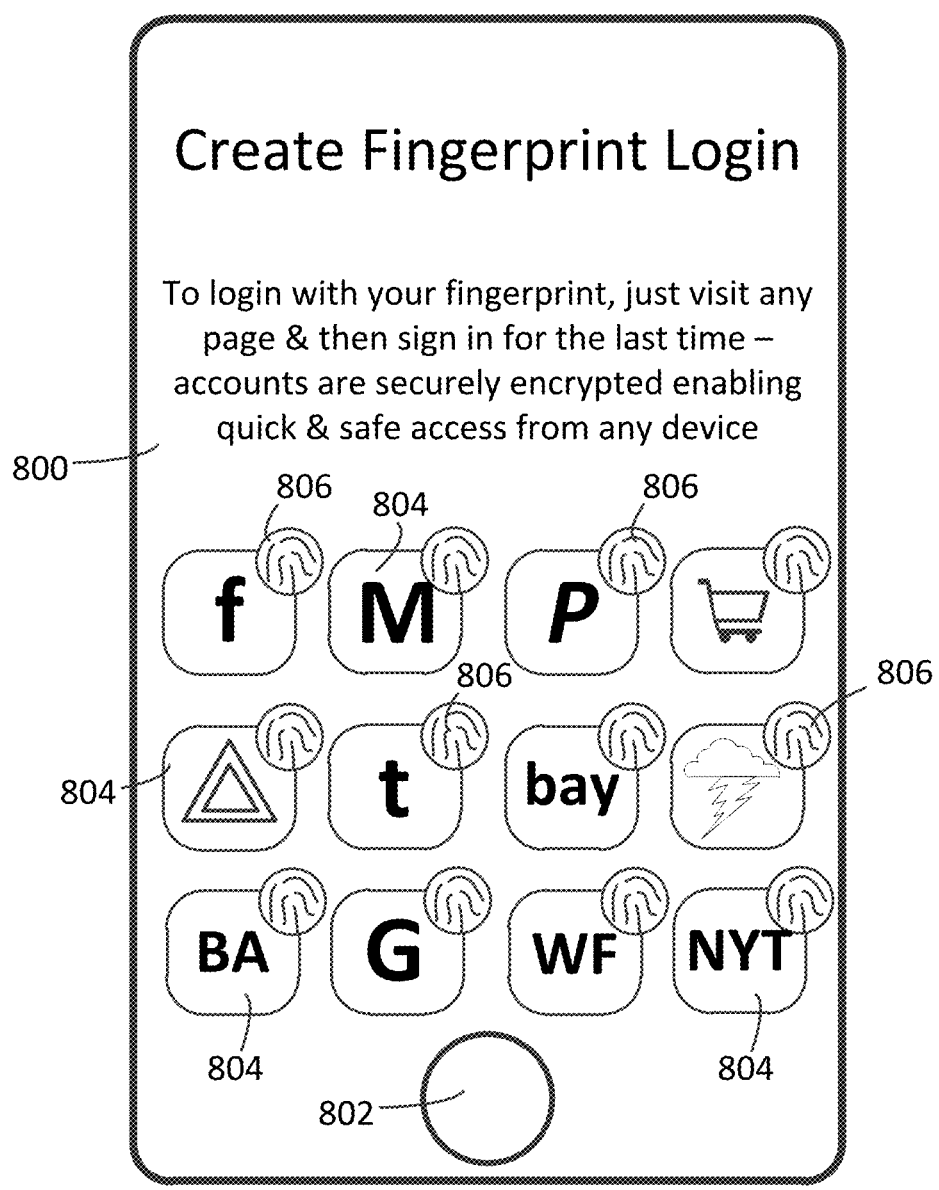
FIGS. 9-12 are screen shots of a user interface for a fingerprint login application, consistent with certain aspects related to the innovations herein.

In one embodiment, the fingerprint login functionality can be added to another of a user's computing devices. A user may download a fingerprint login software application to a computing device that includes a fingerprint sensor. With reference to FIG. 9, an example of a user interface screen on a computing device 800 having a fingerprint sensor 802 and running the fingerprint login application is illustrated. The fingerprint login application can search the memory of the computing device 800 for applications and user login information for the applications. The login information can include for example, user names, passwords, fingerprint authentication or additional user data (e.g., name, age, sex and location).

In one embodiment, the fingerprint login software can ask the user if he or she would like to apply the fingerprint login function to this website or the user may select the applications that he or she would like to apply the fingerprint feature to. The fingerprint login application can display some of the application icons 804 that can be converted to add the fingerprint login feature by displaying these icons 804 with a fingerprint icon 806 to indicate the compatibility of the fingerprint login feature; however, it is fully-compatible with any website that uses a login/password combination to login. In this example, the user interface displays the message to the user, "Create Fingerprint Login" and "To login with you fingerprint, just visit any page & then sign in for the last time—accounts are securely encrypted enabling quick & safe access from any device." The user can then select the applications to apply the fingerprint login to.

Figure 10:
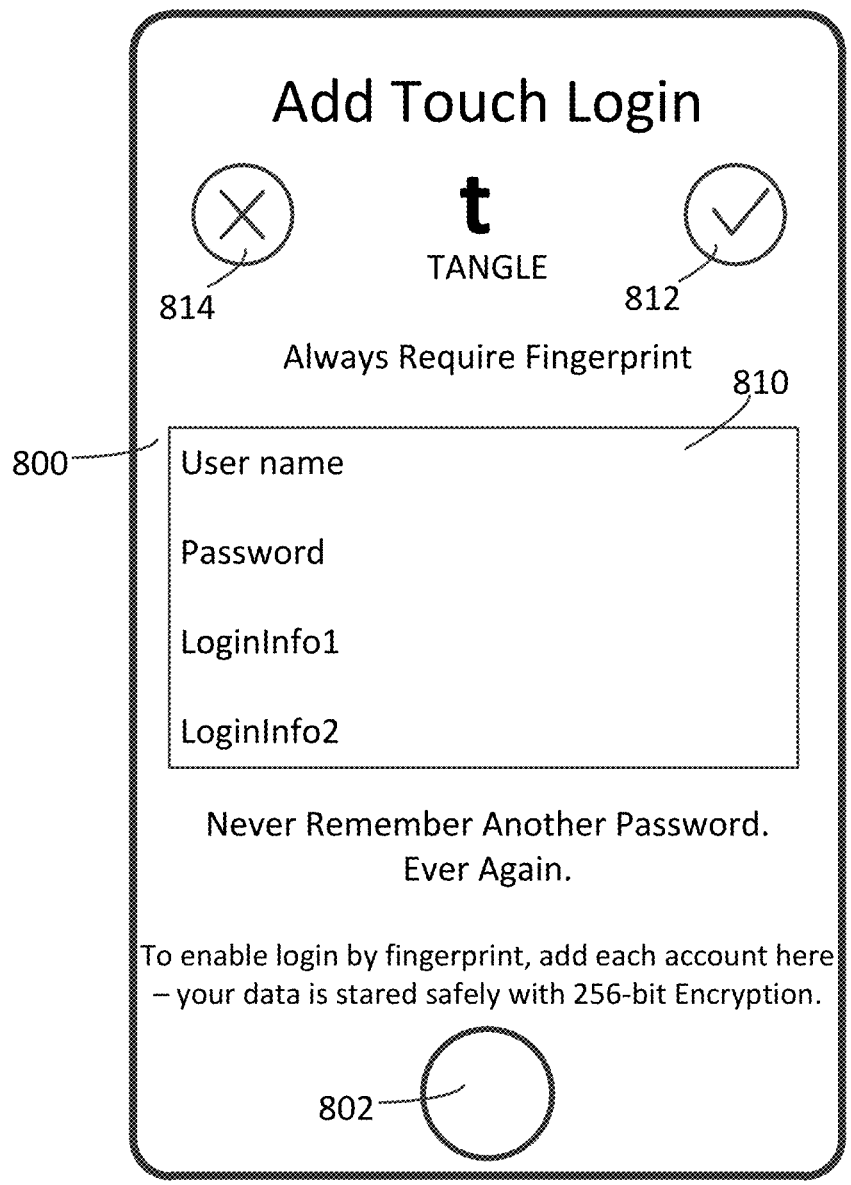

To activate the fingerprint login feature for an application, the user can click on the application for fingerprint login. The computing device can prominently display the application selected by the user and the login input information for the application can be displayed as illustrated in FIG. 10. In this example, the login fields include: Username, Password, LoginInfo1 and LoginInfo2 810. The user can input the user's identification information for each of these login fields 810 and then click the accept button 812 to enter these inputs and apply the fingerprint feature to the application. If the user decides not to use the fingerprint input, the user can click the cancel button 814.

When the accept button 812 is pressed, the login application can then attempt to login to the application to confirm that the application login information and the user fingerprint correct.

Figure 11:
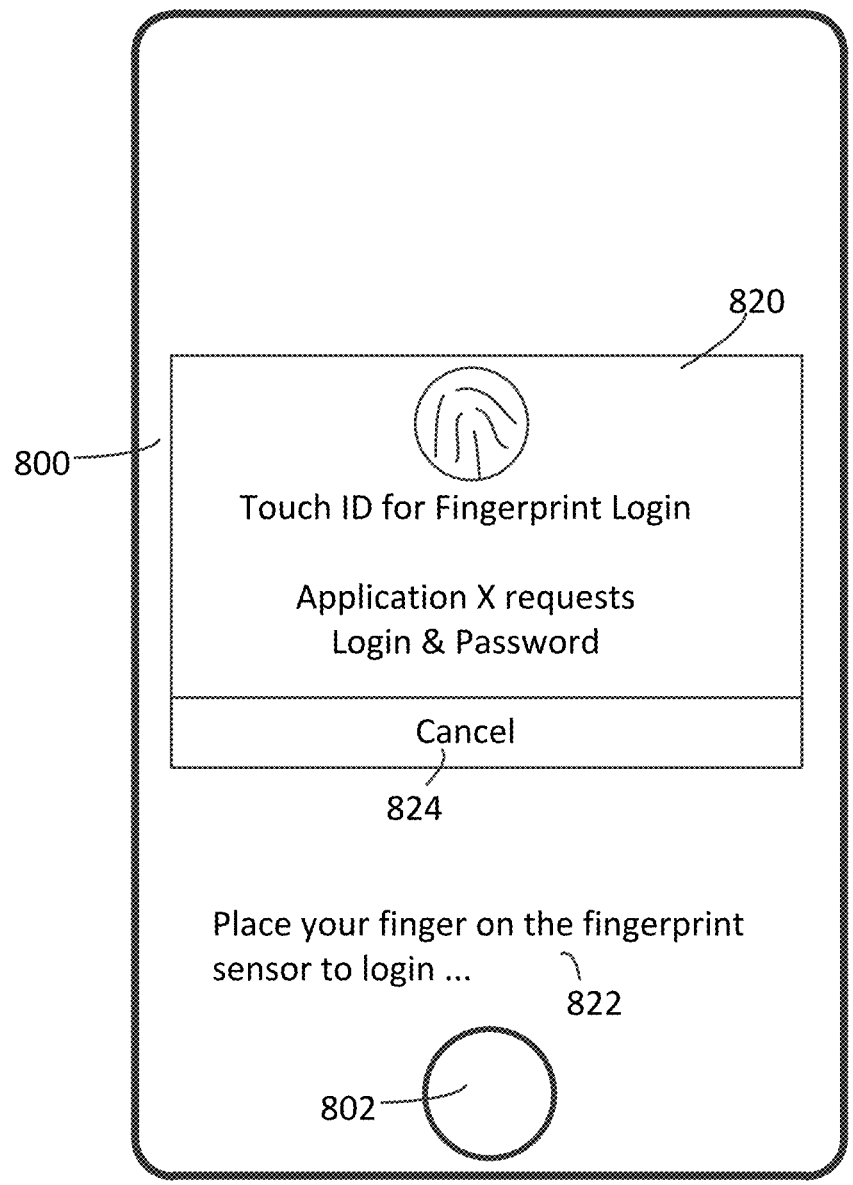

With reference to FIG. 11, the computing device 800 can go to the application login page and the fingerprint login application can inform the user that the application is requesting the login and password and that by touching the fingerprint sensor 802, this information will be used to login to the application. The user interface can also display instructions to place the user's finger on the fingerprint sensor to login 822. The user can respond by placing the finger on the fingerprint sensor 802 to login to the application. In an embodiment, for enhanced security, when the user is scanning their fingerprint, the front-facing camera is activated to take a photo of the user attempting to login. This photo may be sent as a sync signal or kept for security or additional authorization verification e.g., facial recognition. If the computing device confirms the fingerprint the user's login information is input by the app into the website's login field form and automatically submitted so the user will be able to use the application. If the website has integrated the site-wide sync script, the login information will be sent by the fingerprint app directly to the webserver (otherwise the fingerprint app will manually insert the login info into the website login form fields within the app). Alternatively, if the user decides not to use the fingerprint input, the user can click the cancel button 824. After logging in the fingerprint login application may not interfere with the user's interaction with the application.

Figure 12:
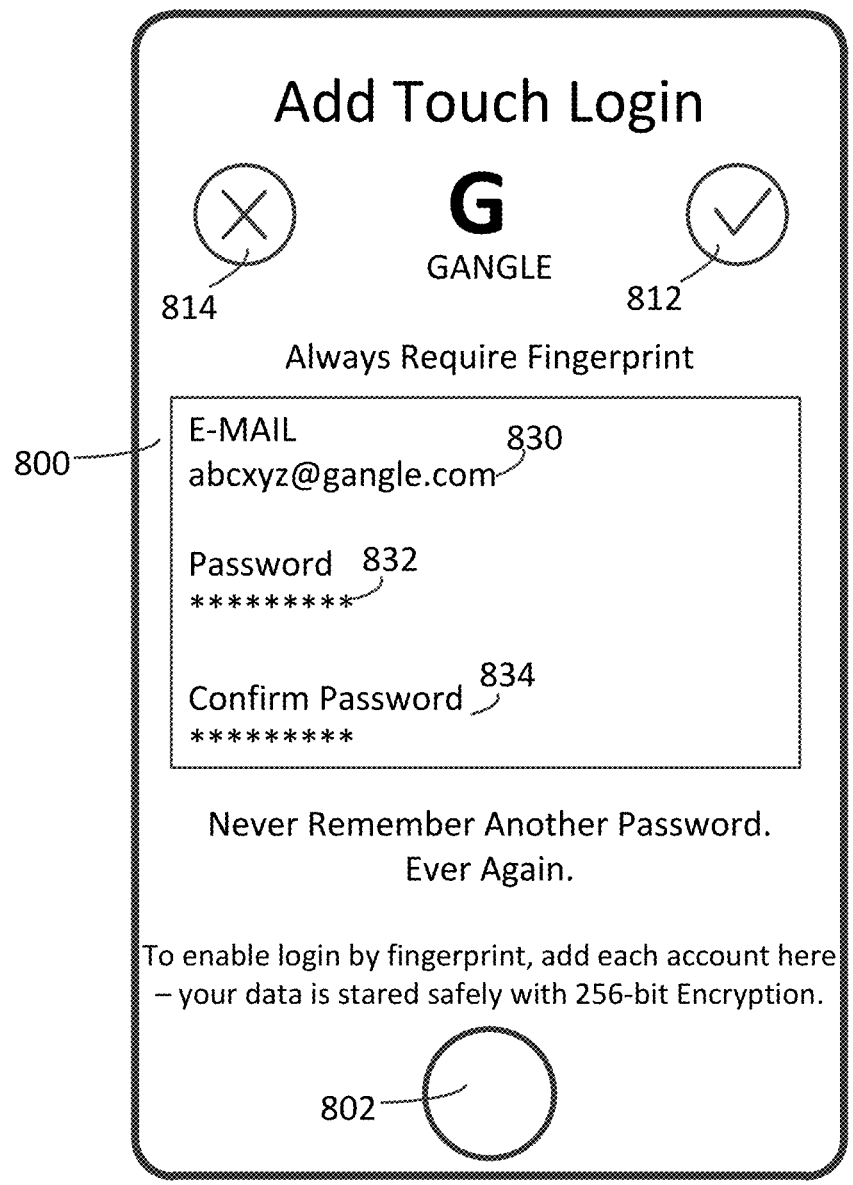

Once the first login is performed for the application using the fingerprint login application, the user's application login information can be stored locally on the device within the fingerprint application and when the user uses the application in the future, the only input required can be the fingerprint. It can be good practice for security reasons to change a user's login information periodically. When the login information is changed for an application the user can edit the login information saved by the fingerprint login application. In some cases, the user may update the login information for an application but fail to update the application login information in the fingerprint login application. If the user attempts to login to an application, and the user information fails, the fingerprint login application can detect this error and display a user interface asking the user to update the login information. With reference to FIG. 12, a user interface of the computing device 800 can display input fields for the user's edited login information. In this example, the user has input an email address abcxvz@gangle.com 830, a new password 832 and a new password confirmation 834. Once the edited login information is input, the user can click the accept button 812 to save the edited login inputs which will be applied when the fingerprint application is used for future logins. Alternatively, the user can click the cancel button 814 to not enter these changes.

Figure 13:
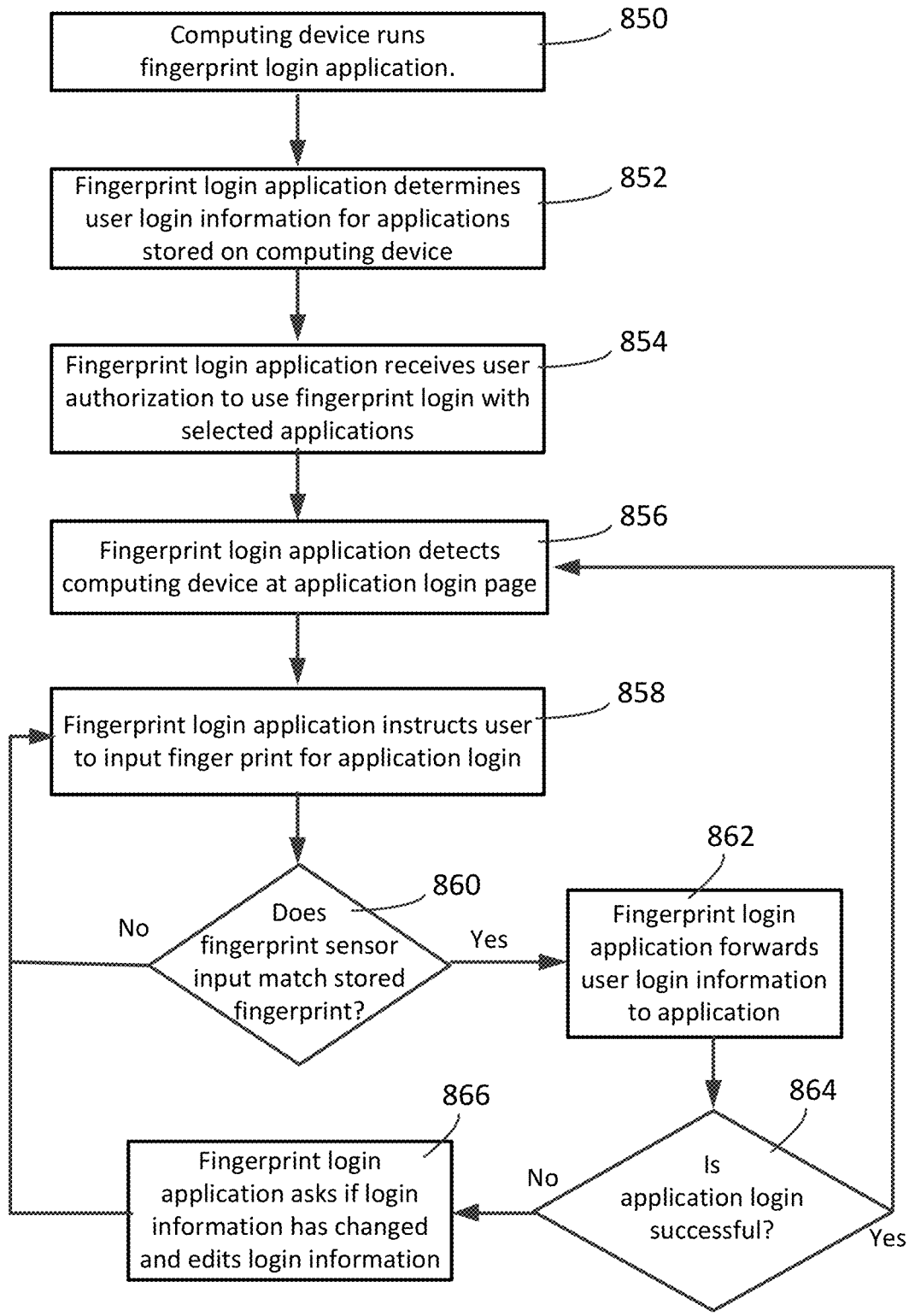
FIG. 13 is a flow diagram illustrating further exemplary fingerprint login application processing, consistent with certain aspects related to the innovations herein.

An embodiment of the fingerprint application functionality can be represented by the flowchart shown in FIG. 13. The fingerprint login application can run on a computing device 850. The fingerprint application can determine the user login information and corresponding applications stored on the computing device 852. The fingerprint login application can receive user authorization to use the fingerprint login feature for some or all applications that have login requirements. The fingerprint application can determine that the user is at a login page of a user authorized fingerprint login application 856. The fingerprint login application can display instructions for the user to touch the fingerprint sensor to input the user fingerprint 858. The computing device can store the user's true fingerprint and compare this to the fingerprint input to the sensor 860 and return a pass or fail signal to the fingerprint login application. If the fingerprint is not a match, the fingerprint login application can go back and ask the user to input the fingerprint again 585. If the fingerprint is a match, the fingerprint login application can forward the stored user login information to the login field form of the application 862. The fingerprint login application can then determine if the application login was successful 864. If the login was successful, the fingerprint login application can wait for the computing device to go to an authorized application login page 856 to repeat the described process. If the fingerprint sensor input was correct but the login information was not accepted, the fingerprint login application can ask the user if the application login information has changed. If the login information has changed, the user can edit the login information for the fingerprint login application 866 and the system can go back and ask the user to input the fingerprint again 585.

The principles illustrated herein may be used in many applications. In the paradigm of the present invention, a first device's first synchronization signal is transmitted over a communication medium (whether electronically or otherwise, even by non-conventional signaling (e.g., audio signal within the human audible range or ultrasonic)) to be mapped into a second device's synchronization signal ("second synchronization signal") that effectuates a useful result. (Generally, the first device need not have the ability to directly communicate or control the second device. A mapping means translates the first synchronization signal to conform to the communication protocol, as well as supplies any necessary additional information regarding the second device that is not known to the first device, to effectuate the communication with the second device.) The second synchronization signal may be likewise mapped to effectuate activity in a third device, as part of a cascade of effects. (In some instances, the first and second devices may be the same device, carrying out different functions in the same or different hardware modules.) The following are exemplary use cases, showing input signal, device types and corresponding synchronization signals:

1. Use case: Electrical Vehicle
   Input: vehicle fuel sensor low-fuel alert
   First Device: vehicle communication system
   First Synchronization signal: refuel request
   Second Device: charging station communication system
   Second Synchronization signal: initiation of refuel request processing
2. Use case: Data storage
   Input: data storage request
   First Device: computing device
   First Synchronization Signal: data storage Request
   Second Device: data storage network manager server
   Second Synchronization signal: data-in-transit storage and selection of destination
   Third Device: storage device
   Third Synchronization Signal: initiation of data storage in storage device (by the
   Third Device or by another downstream device)
3. Use case: health-related alert
   Input: health condition sensor (e.g., heart condition monitor, blood pressure monitor) alert signal
   First Device: computing device
   First Synchronization Signal: appropriate health-related assistance request (e.g., defribillation required)
   Second Device: communication system
   Second Synchronization signal: corresponding assistance request message
   Third Device: emergency response service
   Third Synchronization Signal: initiation of corresponding assistance process (e.g., dispatching first-responder, sending drone or other delivery means to send necessary equipment)
4. Use case: order fulfillment service
   Input: user order
   First Device: computing device
   First Synchronization Signal: appropriate ordering signal specifying vendor
   Second Device: communication system
   Second Synchronization signal: corresponding order signal to vendor
   Third Device: vendor fulfillment center
   Third Synchronization Signal: initiation of order fulfillment process (e.g., retrieving ordered product, setting up and carrying out delivery to customer address).
5. Use case: customized encrypted/locked image display
   Input: image or web page
   First Device: computing device First Synchronization Signal: signal customized to each selected device, sending image or web page in secured form Second Device: computing device Second Synchronization signal: initiation of secured display of image or web page (requiring verification of secured access information, such as password, fingerprint or retinal scan, or decryption key, on the same or another device, to complete display process)

Note: Second Device may allow free access to certain portions of the received image or web page, requiring verification or authorization only on specific restricted portions of the image or web page.

6. Use case: access to local storage data

Input: network message indicating specified primary source for content not reachable First Device: computing device First Synchronization Signal: request for local content Second Device: computing device Second Synchronization signal: return of requested data from local storage 7. Use case: Virtual device (e.g., cardboard piano)

Input: state information of virtual device

First Device: monitoring device

First Synchronization Signal: signal representing interpretation of the state information (e.g., keys pressed on cardboard piano)

Second Device: actuation device

Second Synchronization signal: actualization of state information (e.g., creating corresponding sound based on keys pressed represented in state information)

Note: in the cardboard piano example, the monitoring device may a software module on a smartphone monitoring the pressing of "keys" on the cardboard piano, and the actuation device may be another software module that plays the notes corresponding to the pressed "keys" on one or more speakers of the smartphone.

8. Use case: device data look-up

Input: cursor location

First Device: computing device

First Synchronization Signal: signal representing recognition of device identifier (e.g., UDID)

Second Device: computing device

Second Synchronization signal: database look-up of device information based on device identifier and return device information 9. Use case: remote sensing Input: local environmental sensor output (e.g., sound)

First Device: computing device

First Synchronization Signal: signal representing sensor output

Second Device: computing device

Second Synchronization signal: reproduction of stimulus (e.g., sound) based on received First Synchronization signal representing sensor output 10. Use case: data transmission Input: data values that vary about an offset value First Device: computing device First Synchronization Signal: send differences between the data values and the offset value Second Device: computing device Second Synchronization signal: restored data values from received differences 11. Use case: communication regarding shared experience Input: sounds at a first location where the common experience is shared (e.g., watching at different locations the same live broadcast of a sporting event)

First Device: computing device

First Synchronization Signal: signal representing the sounds at the first location Second Device: computing device Second Synchronization signal: reproduction at a second location of the sounds at the first location based on the signal received 12. Use case: remote device operation Input: control command for remote device (e.g., command to take a picture)

First Device: computing device

First Synchronization Signal: signal representing the control command

Second Device: remote device

Second Synchronization signal: carrying out the control command (taking a picture)

13. Use case: remote sensing customized for individual recipients of sensed information Input: local environmental sensor outputs (e.g., sounds, image-only, multiple speakers)

First Device: computing device

First Synchronization Signal: signals for customization for each recipient, each representing a customized portion of local environmental outputs (e.g., sound-only, image-only, specified speaker-only)

Each Second Device: computing device

Each Second Synchronization signal: reproduction of sensor output represented by the received First Synchronization signal 14. Use case: remote control or modification of environment (sounds or visual effects)

Input: change or modification command

First Device: computing device

First Synchronization Signal: signals to actuation devices each encoding a customized desired change or modification to be carried out by the recipient Each Second Device: actuation device (e.g., audio speaker, lights, projectors)

Each Second Synchronization signal: carrying out the desired change or modification command based on the received First Synchronization signal Note: in one use case, the change command may be a visual filter (e.g., provide a sepia effect or a camera filter on the image or removing a character—both sight and sound—from a scene)

15. Use case: remote sensing from multiple sensors (e.g., in a virtual or augmented reality head gear with microphones, gyroscopes, cameras)

Input: input signals from local sensors (e.g., IoT sensors in proximity)

First Device: computing device

First Synchronization Signal: signal representing aggregation of the local sensor signals for a time period Second Device: computing device Second Synchronization signal: de-aggregation of sensor signals from the received First Synchronization signal for signal processing and tracking 16. Use case: coordinating sound or visual effects in a virtual environment Input: sound or visual stimulus First Device: computing device First Synchronization Signal: signal representing the sound or visual stimulus Second Device: computing device controlling the virtual environment
Second Synchronization signal: injecting sound corresponding to the visual stimulus or injecting visual effects corresponding to the sound stimulus in the received First Synchronization signal 17. Use case: remote control from a first device of a user interface on a second device
    Input: user interface command (e.g., show pop-up, notification, alert)
    First Device: computing device
    First Synchronization Signal: signal providing both command (e.g., delayed display by a specified time period) and data (the content to be displayed)
    Each Second Device: computing device (e.g., audio speaker, lights, projectors)
    Each Second Synchronization signal: carrying out the required operation according to the received First Synchronization signal 18. Use case: proximity or location-based trigger
    Input: signal from proximity or location sensor (e.g., NFC or GPS sensor)
    First Device: computing device
    First Synchronization Signal: signal to one or more actuators to carry out a task, the task being determined based on interpretation of proximity or location sensor signal
    Each Second Device: actuator
    Each Second Synchronization signal: carrying out the required task according to the received First Synchronization signal 19. Use case: synchronizing software among computing devices
    Input: installing or updating software in one device
    First Device: computing device
    First Synchronization Signal: signal indicating change in state in software
    Each Second Device: computing device
    Each Second Synchronization signal: performing update or installation to match the software state in the first device 20. Use case: distributed search
    Input: a search query
    First Device: computing device
    First Synchronization Signal: signals each representing an assigned search task that is a component of the total search task to respond to the search query
    Each Second Device: search engine
    Each Second Synchronization signal: carrying out the assigned search task in the signal received 21. Use case: event-triggered collection of action data at a sporting event
    Input: detection of an event (e.g., a goal scored)
    First Device: computing device
    First Synchronization Signal: signal encoding data relevant to the event (e.g., position from which the goal is scored, player identified, trajectory of the ball)
    Second Device: actuator
    Second Synchronization signal: instant replay on stadium display, playing a selected footage that best present the event (e.g., selecting an angle best showing the player who scored, or having an unobstructed view of the ball trajectory)

22. Use case: collaboration among multiple devices
    Input: command to carry out a collaborative task
    First Device: computing device
    First Synchronization Signal: signals each encoding one or more requests for carrying out a component task by another device
    Each Second Device: computing device
    Each Second Synchronization signal: signals each encoding one or more requests for carrying out a component task by another device of the task requested in the received First Synchronization signal 23. Use case: virtual reconstruction of "world" based on motion sensor and environmental sensors
    Input: motion sensors and environmental sensors at a scene (e.g., in a moving vehicle)
    First Device: computing device
    First Synchronization Signal: signal recording sensor outputs (e.g., from position, velocity and acceleration sensors in the vehicle and from wind speed sensors, light intensity, humidity sensors in the environment)
    Second Device: computing device
    Second Synchronization signal: reconstruction of the virtual world in one or more devices, based on the received First Synchronization signal 24. Use case: inventory tracking
    First device: sales terminal
    First Synchronization Signal: signal indicating sale or return of a tracked item
    Second Device: inventory management system
    Second Synchronization signal: update inventory system based on received First Synchronization signal 25. Use case: access-control decoy in a secured domain
    Input: activity by a user coming into the secured domain
    First device: security monitoring system
    First Synchronization Signal: signal to all secured systems in the domain identifying a specific user to be suspicious
    Each Second device: Operational system
    Second Synchronization signal: steering the identified user to a quarantined decoy area (e.g., via a decoy login procedure) of the operational system when the identified user attempts access, while triggering additional security measures.

26. Use case: vehicle condition (e.g., in a commercial fleet)
    Input: sensors in a vehicle (e.g., position, velocity and acceleration sensor, road condition sensors, and status of each reportable system)
    First Device: communication device
    First Synchronization Signal: signal encoding the sensor data in the vehicle
    Second Device: vehicle operation database
    Second Synchronization signal: integration of the sensor data into the vehicle operation database.

27. Use case: data processing of frequently changing data in an application program
    Input: frequently changing data
    First Device: module for loading frequently changing data
    First Synchronization Signal: signal indicating new data is loaded
    Second Device: executable code of the application program
    Second Synchronization signal: executing the application program using the most recently loaded data upon based on the First Synchronization signal.
    Note: In some embodiments, loading of the new data may trigger a security procedure which allows only a qualified or authorized device to operate on or decrypt the data (e.g., through fingerprint authentication).

28. Use case: control access to private data on multiple devices
    input: authenticated credentials
    First Device: computing device
    First Synchronization Signal: signal indicating a specific user has presented authenticated credentials
    Second device: computing device
    Second Synchronization signal: allowing access by the specific user to private data on the Second device.
    Note: in some embodiments, differential credentials may allow different levels of access. For example, a user whose profile indicates him or her to be juvenile may be allowed lesser access to certain private data.
29. Use case: time synchronization among multiple devices in a group
    Input: command to set time
    First Device: any electronic device
    First Synchronization Signal: signals to other members of the group indicating setting of a date or time
    Each Second Device: any electronic device
    Each Second Synchronization signal: setting device time or data based on the received First Synchronization signal, taking into account the time zone of the First device.
30. Use case: activities related to taking of a photograph
    First Device: camera
    First Synchronization Signal: signal indicating a photograph has been taken
    Each Second Device: computing device
    Each Second Synchronization: carrying out an assigned task for the Second Device; for example, one device may upload the photograph to storage or to post to an online website, and another device analyzes photograph to recognize people or place in the photograph.
    Note: in some embodiments, some Second Synchronization signals send the photograph to devices belonging to people who is recognized to be present in the photograph
31. Use case: turning on display only when authorized using is watching the screen
    Input: detection that an authorized using is viewing a display
    First Device: computing device
    First Synchronization Signal: control signal to display that indicates that the authorized user is watching
    Each Second Device: display device
    Each Second Synchronization signal: turning on display to show information or content on screen
32. Use case: proximity-based access
    Input: detection of the physical location of a user seeking remote access
    First Device: computing device
    First Synchronization Signal: control signal indicating the security procedure that should be used to authenticate the user
    Second Device: control access security system
    Second Synchronization signal: carrying out security procedure based on the received First Synchronization signal.
33. Use case: improvement of user experience in a virtual road trip environment
    Input: vehicle motion sensor and environmental sensor inputs
    First Device: computational module
    First Synchronization Signal: based on simulated road conditions created from sensor inputs, control signals to actuators to create or enhance user experience
    Each Second Device: actuator (e.g., steering wheel)
    Each Second Synchronization signal: create or enhance user experience by operation of actuator (e.g., braking action to create sensation of change in travel direction)
34. Use case: presentation of only relevant feature in a scene
    Input: multiple images of a scene taken simultaneously from cameras at different angles
    First Device: computational module for scene analysis
    First Synchronization Signal: scene analysis data identifying features and environmental conditions in the scene
    Second Device: computational module for scene reconstruction and display
    Second Synchronization signal: data that allows reconstruction and enhancement of the scene with non-salient features eliminated or augmented
35. Use case: Control of manned or unmanned flying device or vehicle (e.g., drones, planes, and helicopters)
    Input: a task involving transportation (e.g. a task that requires a vehicle, such as an order of goods or equipment to be delivered by a drone)
    First Device: vehicle order entry system
    First Synchronization signal: task specification including a vehicle request
    Second Device: order fulfillment and delivery system
    Second Synchronization signal: dispatches a suitable vehicle to collect payload and deliver to destination
36. Use case: creation of a suitable environment for an occasion
    Input: environmental condition (e.g., sunset, evening breeze, time of day, recognized people in the room etc.)
    First Device: computing device
    First Synchronization signal: output signal representing environmental condition
    Second Device: home atmosphere/theater system
    Second Synchronization signal: creation of atmosphere suitable for detected environment (e.g., suitable lighting, temperature, music relevant to the detected mood)
37. Use case: trusted transaction
    Input: proposed commercial transaction (e.g., signing a contract)
    First Device: first party's information processing system (e.g., an offeror or buyer of a purchase transaction)
    First Synchronization signal: first party's electronic signature and authentication credentials
    Second Device: second party information processing system (e.g., a seller of a purchase transaction)
    Second Synchronization signal: second party's electronic signature and authentication credentials
38. Use case: remote control
    Input: gesture or speech signal from controller
    First Device: gesture or speech recognition system
    First Synchronization signal: interpretation of gesture or speech
    Second Device: actuator (e.g., camera angle or positioning, shutter, lighting control etc.)
    Second Synchronization signal: appropriate command to actuator based on the interpretation
39. Use case: remote reset
    Input: a sensed operational condition of a specific controlled device (e.g., erroneous operation).
    First Device: general purpose controller for multiple controlled devices
    First Synchronization signal: command to the specific controlled device based on interpretation of the sensed condition
    Second Device: the specific controlled device Second Synchronization signal: appropriate action responsive to command (e.g., reset, retry)

40. Use case: use of non-conventional communication channel
    Input: an emergency or irregular situation (e.g., bank robbery, hostage-taking)
    First Device: emergency or irregular situation detection system
    First Synchronization signal: alarm signal sent over unobvious, non-conventional communication channel (e.g., using ultrasonic or other unobvious hidden channel):
    mapper: receiver of the alarm signal over the non-conventional communication channel to appropriate response selecting an appropriate system
    Second Device: the selected response system
    Second Synchronization signal: dispatch of the appropriate response 41. Use case: access from a trusted device (e.g., an augmented reality or virtual reality head gear) to an access-controlled device without requiring presentation of credentials
    Input: request from a user of the trusted device for a specific task (e.g., play a song) to be performed
    First Device: trusted device
    First Synchronization signal: present credentials (that is hidden from the user) to a suitable access-controlled device for the task
    Second Device: the selected access-controlled device
    Second Synchronization signal: grants access and perform requested task 42. Use case: distributed encryption key generation
    Input: request for an encryption key
    First Device: a trusted device
    First Synchronization signal: requests to multiple encryption key servers on a network
    Each Second Device: each key server on the network
    Second Synchronization signal: generation a portion of the requested encryption key; the requested encryption key is constructed from all the Second Devices.
    Note: under this process, no single device or server possess the entire encryption key, which can be decrypted only by the target device gathering a corresponding decryption key from the key servers using an analogous process.

43. Use case: Conditional display of image
    Input: detection of a physical security condition (e.g., delivery person at the porch)
    First Device: perimeter security system
    First Synchronization signal: security camera video feed
    Each Second Device: display device
    Second Synchronization signal: display of camera video feed 44. Use case: Conditional connection to a network (any of a number of cellular networks)
    Input: call setup or data to be transmitted
    First Device: communication app
    First Synchronization signal: data to be transmitted over any of the network
    Second Device: communication circuit customized to a selected network
    Second Synchronization signal: transmission of the data or setting up a call over the selected network 45. Use case: Parental Control of video viewing
    Input: video feed
    First Device: content filter (e.g., recognizing content based on user identity, user preferences, location, privacy settings, feature recognition, text recognition, a trained machine etc.)
    First Synchronization signal: signal indicating detection of filter-matched content
    Second Device: display device
    Second Synchronization signal: show video feed after removal or substitution of filter-matched content 46. Use case: Gesture-based commands (e.g., access control)
    Input: user expression or gesture (e.g., eyes glancing up and down, hand movements, etc.)
    First Device: gesture or expression detection software
    First Synchronization signal: interpretation of input user expression or gesture
    Second Device: access-controlled device
    Second Synchronization signal: grant or denial of access
    Note: location of fingers in space, position of cursors on a screen, combination of gestures, position of a user's eyes or other form of signaling may be similarly interpreted. In addition to granting access, the gesture or expression may be interpreted as a command or group of commands and carried out by the access-controlled device.

47. Use case: Customized or Personalized Service
    Input: service request from a user (e.g., asking help on a particular subject)
    First Device: user identification system
    First Synchronization signal: identity of user and service request
    Second Device: service request fulfillment device (e.g., tutorial server)
    Second Synchronization signal: a request for service customized to the requesting user 48. Use case: multiple device activation
    Input: incoming data from communication channel
    First Device: storage device manager
    First Synchronization signal: storage device activation signals
    Each Second Device: any of multiple storage devices (e.g., USB, CD/DVD drives, or magnetic disks that are, for example, plugged into or connected to the First Device, in the proximity of the First Device, or within a geographic distance measured based on GPS or other location-based determination means)
    Each Second Synchronization signal: activation signal to the storage devices in the proximity for subsequent operations 49. Use case: Parking assistance
    Input: signals from gyroscope, accelerometer or other motion sensors
    First Device: computing device
    First Synchronization signal: upon determination that the user carrying the computing device is in a vehicle looking for a parking space (e.g., based on location and movement), a parking space request
    Second Device: parking space manager in the proximity
    Second Synchronization signal: identification of a nearest vacant parking space and return location to the First Device.

50. Use case: Differential Privacy
    Input: query to a database
    First Device: database query interface
    First Synchronization signal: data record retrieval request or requests
    Second Device: statistical data record retrieval and filter Second Synchronization signal: data record retrieval request or requests, with instructions for post-processing to create statistical report that achieves differential privacy
51. Use case: Locally stored data
 Input: request for data
 First Device: database query interface
 First Synchronization signal: data record retrieval request or requests
 Second Device: distributed database manager
 Second Synchronization signal: local database search for requested data records, followed by remote database search for requested data records, if local search fails
52. Use case: Generation of alerts or notifications
 Input: signals from event or environmental monitors
 First Device: processor of the monitored signals
 First Synchronization signal: signal indicating a monitored condition is met
 Each Second Device: alert or notification generator
 Each Second Synchronization signal: sending responsive alerts or notification customized to clients of each Second Device.
53. Use case: "Smart" Integration of Content
 Input: new content being created (e.g., new photograph taken)
 First Device: computing device
 First Synchronization signal: signal for storage of new content
 Each Second Device: computing device with local storage
 Each Second Synchronization signal: create searchable index to integrate new content with existing content (e.g., identify objects or individuals in photograph, and create new index or merge existing index to facilitate future retrieval in each Second Device
54. Use case: Update integrity
 Input: new version of specific software
 First Device: computing device
 First Synchronization signal: request to update specific software
 Each Second Device: a second software having data or code dependency to the specific software to be updated
 Each Second Synchronization signal: request to update second software
55. Use case: Player Profile Synchronization (e.g., in VR or AR Games)
 Input: new player entering or changes in player profile during game (e.g., changes to attire in an avatar)
 First Device: first game console
 First Synchronization signal: new or updated player profile
 Each Second Device: a second game console
 Each Second Synchronization signal: update to corresponding player profile in the Second Device
56. Use case: Communication interpreted
 Input: communication from a first user
 First Device: first computing device, associated with the first user
 First Synchronization signal: transmission of the communication
 Each Second Device: a second computing device, associated with second user
 Each Second Synchronization signal: based on the First Synchronization Signal, the first user's profile or previous interactions between the first user and the current second user, the communication is rendered with safeguards or reformed (e,g, or reworded or restructured to avoid misinterpretation (e.g., "note: possible sarcasm," or "note: alternative meaning— . . . ") or to better convey the first user's perceived, intended meaning
57. Use case: Communication restricted
 Input: video, audio or another form of communication from a first user
 First Device: first computing device, associated with the first user
 First Synchronization signal: transmission of the communication
 Each Second Device: a second computing device, associated with second user
 Each Second Synchronization signal: based on the current second user's authorization, certain portion of the communication may be altered, blocked or substituted by suitable content (e.g., image or certain information regarding first user may be masked)
58. Use case: Customized data flow
 Input: data or information sent to a first user
 First Device: first computing device, associated with the first user
 First Synchronization signal: transmission of the information to one or more second users
 Each Second Device: a second computing device, associated with second user
 Each Second Synchronization signal: based on the current second user's authorization, the information may be customized (e.g., restricted, augmented or substituted by suitable or related content)
59. Use case: barriers and doors (e.g., in a VR or AR game)
 Input: action by a first user
 First Device: first computing device, associated with the first user
 First Synchronization signal: transmission of the first user's action
 Each Second Device: a second computing device, associated with second user
 Each Second Synchronization signal: restriction or facilitation in second user's actions (e.g., permission given or withdrawn for certain subsequent actions)
60. Use case: Gesture-based or facial expression-based commands
 Input: facial expression or gesture (e.g., eyes glancing up and down, hand movements, etc.)
 First Device: gesture or expression detection software, associated with first user
 First Synchronization signal: interpretation of the input user facial expression or gesture, according to first user's profile
 Second Device: gesture or expression detection software, associated with a second user
 Second Synchronization signal: interpretation of the input user expression or gesture according to second user's profile
61. Use case: appropriate input means (e.g., keyboard switching)
 Input: user activity (e.g., visiting a website with a login requirement)
 First Device: computing device or software module
 First Synchronization signal: interpretation of user activity as requiring user input
 Second Device: computing device or software module
 Second Synchronization signal: display of suitable keyboard or input element (e.g., activation of fingerprint scanner)
62. Use case: intensive agriculture or hydroponic cultivation
 Input: changes in lighting condition
 First Device: controller for individual or group of plants First Synchronization signal: command for response to the change in lighting condition to multiple Second Devices Each Second Device: controller for a plant management factor Each Second Synchronization signal: dispense specific response managed by the Second Device (e.g., $CO_2$ in air, release of fertilizer or nutrient in soil)

63. Use case: blockchain-based contract performance (e.g., purchase transaction related to a cryptocurrency)

Input: satisfaction of a condition specified in the contract (e.g., payment)

First Device: computing device, associated with a party having an obligation to perform based on satisfaction of the condition First Synchronization signal: performance of the obligation by creating record in the blockchain (e.g., ownership transfer from seller)

Each Second Device: computing device, associated with another party of the contract Each Second Synchronization signal: acknowledgement of the First Device's performance of its obligation by creating an acknowledgement record in the blockchain (e.g., ownership receipt at buyer, transaction fee received at bank)

64. Use case: virtual reality (VR) or augmented reality (AR) experience in a traveling vehicle Input: motion of the traveling vehicle (e.g., braking, turning, acceleration)

First Device: controller that interprets input motion

First Synchronization signal: interpretation of the input

Second Device: VR or AR head gear

Second Synchronization signal: corresponding visual and audio elements added to user experience 65. Use case: facial expression extraction Input: images from a video sequence including subjects with meaningful facial expression (e.g., eyes movements, facial muscles movements)

First Device: gesture or expression detection software

First Synchronization signal: transmission of video frames capturing the facial expression Second Device: expression detection software Second Synchronization signal: extraction, recognition or interpretation of the input expression, identification of subjects, and actions taken based on the extraction, recognition or interpretation of the input expression, or identification of subjects 66. Use case: cryptocurrency transaction First Device: computing device, associated with a first user First Synchronization signal: request for service (e.g., data storage, a GPS fix, motion feedback)

Second Device: computing device, associated with service provider

Second Synchronization signal: perform service and credit an account associated with the requesting user with an amount of cryptocurrency as reward for using the provider's service.

67. Use case: Augmented Reality experience

Input: signals from environment sensors (e.g., lighting conditions, or sounds) or motion sensors (e.g. gyroscope, accelerometer or other motion sensors)

First Device: computing device

First Synchronization signal: selection and adaptation of input signals for creation or augmentation of user experience Second Device: an experience device (e.g., a VR/AR head gear or another actuator)

Second Synchronization signal: using selected and adapted signals to augment (e.g., injection of suitable background music) to augment user experience 68. Use case: electronic contract performance (e.g., purchase transaction related to a cryptocurrency)

Input: condition satisfied for one party of the contract to perform an obligation in the contract (e.g., payment)

First Device: computing device, associated with the party having the obligation

First Synchronization signal: performance of the obligation and creating of an electronic record to memorialize the performance (e.g., ownership transfer of certain amount of cryptocurrency from seller)

Each Second Device: computing device, associated with another party of the contract Each Second Synchronization signal: acknowledgement of the First Device's performance of its obligation by creating an electronic acknowledgement record (e.g., ownership receipt at buyer, transaction fee received at bank)

One advantage of the present invention is data privacy. For example, operation in the second device may involve personal information subject to privacy protection (e.g., information protected under the General Data Protection Requirements of the European Union) which is not known or to be disclosed to a user of the first device. In some embodiments of the present invention, the protected information may be supplied to the second device by the mapping means without risk of the disclosure to the user of the first device. In some embodiments, the signals are transmitted in encrypted form for security. The encryption keys may be one time-only or for limited time. In some embodiments, passwords, encryption keys and other authentication or security mechanisms may be reauthorized or revoked under certain circumstances. For example, stored data that is encrypted by key that is revoked can no longer be decrypted.

In addition, access to the second device may be strictly controlled, such as by temporary passwords or one time-only passwords. For example, to authorize the second synchronization signal, the first synchronization signal must include a temporary password during a predefined period time or present a one time-only password valid for a single use. In some instances, once authorized, the second synchronization signal may be triggered without further authorization in response to subsequent first synchronization signals.

In some embodiments, the mapping means may perform mapping in "layers." That is, the first synchronization signal, the first synchronization signal may be interpreted by multiple layers of interpreters, with each layer providing one or more intermediate synchronization signals, based on the organization of the system in which mapping means resides. The intermediate synchronization signal or signals may be used to actuate related operations in different portions of the system or for security reasons, before triggering an ultimate Second Synchronization signal.

In some embodiments, tutorials (i.e., brief descriptions of actions represented by the synchronization signals) may be displayed in conjunction with issuing the synchronization signals to inform the user of the actions taken.

Signals of the present invention may take any suitable forms. For example, any input or output signal may be provided as a pattern displayed as an image on a screen, or as the flickering pattern of light on the display. As another example, any signal may be provided in the form of executable or interpretable code in any suitable programming language, e.g., C, Java, MIPS, Scheme, Recursive code, machine code, or assembly code. In some instances, a user action (e.g., making a purchase at a vendor website) may be seen as the first synchronization signal that triggers further activities (i.e., second synchronization signals).

The present invention does not impose any restrictions on the computing devices that can be synchronized (e.g., desktop computers, notebook computers, mobile devices (e.g., smartphones or tablets), wearable devices (e.g., clothes, smart glasses, or watches), or quantum computers).

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for synchronizing content between a first electronic device and a second electronic device in response to an input signal, the method comprising:
receiving a first synchronization signal from the first computing device that is based on the input signal being received in the first electronic device;
mapping the first synchronization signal to a second synchronization signal based on mapping information accessible to the second electronic device, wherein the second synchronization signal includes information not represented by the first synchronization signal; and
transmitting the second synchronization signal to the second electronic device for processing, wherein (i) the input signal comprises data derived from one or more sensors; (ii) the first electronic device comprises a controller that interprets the input signal to provide the first synchronization signal, and (iii) the second electronic device comprises an actuator and wherein the second synchronization signal corresponds to a command for the actuator in the second electronic device.

2. The method of claim 1, wherein the first and second electronic devices comprise respectively first and second modules in a single electronic device.

3. The method of claim 1, wherein (i) the input signal represents motion in a traveling vehicle; (ii) the first electronic device comprises a controller that interprets the motion, and (iii) the second electronic device comprises a virtual reality or augmented reality head gear that supplies visual and audio elements to provide user experience.

4. The method of claim 3, wherein the motion comprises one or more of braking, accelerating, turning and banking.

5. The method of claim 1, wherein (i) the input signal represents a condition specified in a blockchain-based contract that has been satisfied, (ii) the first electronic device comprises a first computing device associated with a first party having an obligation to perform based on satisfaction of the condition, (iii) the first synchronization signal comprises a record created in a blockchain to represent the first party fulfilling the obligation, (iv) the second electronic device comprises a second computing device associated with a second party of the contract and (v) the second synchronization signal comprises a record in the blockchain created by the second electronic device to represent acknowledgement of the first synchronization signal.

6. The method of claim 5, wherein the method pertains to a cryptocurrency transaction.

7. The method of claim 1, wherein (i) the method pertains to a virtual reality (VR) or augmented reality (AR) game, (ii) the input signal represents a facial expression or gesture, (iii) the first electronic device interprets gesture or expression according to a profile of a first user, and (iv) the second electronic device interprets gesture or expression according to a profile of a second user.

8. The method of claim 7, wherein the facial expression or gesture comprises one or more of: eye movements, one or more head movements, a movement of one or more bodily limps, and a movement of one or more fingers.

9. The method of claim 1, wherein (i) the method pertains to photography, (ii) the input signal represents taking of a photograph, (iii) the first electronic device comprises a camera and the first synchronization signal transmits the photograph to a plurality of electronic devices, and (iii) the second electronic device comprises one of the electronic devices receiving the photograph and the second synchronization signal comprises instructions to perform one or more of the tasks: uploading the photograph to storage, posting the photograph to an online website, analyzing one or more people or places appearing in the photograph, and transmitting the photograph to one or more of the people recognized to have appeared in the photograph.

10. The method of claim 1, wherein (i) the method pertains to integrating new content with existing content, (ii) the input signal represents the new content being created, (iii) the first synchronization signal represents commands to store the new content by the first electronic device to an associated storage system, and (iv) the second synchronization signal creates a searchable index to integrate the new content with existing content in the storage system.

11. The method of claim 10, wherein (i) the new and existing contents pertain to photographs or videos, and (ii) the searchable index is created based on identifying objects or individuals represented in the stored content of the storage system, so as to facilitate search of the stored content based on the identified objects or individuals.

12. The method of claim 1, wherein (i) the first and second electronic devices comprise respectively first and second modules in a single electronic device, (ii) the input signal represents a new version of a specific software in the first module, (iii) the first synchronization signal requests update of the specific software in the first module, and (iv) the second synchronization signal requests to update a second software in the second module that has data or code dependency to the specific software to be updated.

13. The method of claim 1, wherein (i) the method pertains to a virtual reality (VR) or augmented reality (AR) game of multiple players, (ii) the input signal represents a new player appearing or a change in a player profile, (iii) the first and second electronic devices are each associated with a player of the VR or AR game, and (iv) the first and second synchronization signals represent saving the new or updated player profile in the respective first and second electronic devices.

14. The method of claim 1, wherein (i) the method pertains to distributed encryption key generation, (ii) the input signal represents a request for an encryption key, (iii)

the first device represents a trusted device collecting a portion of the encryption key from a plurality of encryption key servers, and (iv) the second electronic device comprises one of the encryption key servers, and the second synchronization signal generates a portion of the requested encryption key.

15. The method of claim 14, wherein the second synchronization signal also generates a partial decryption key to the encryption key that corresponds to the portion of the encryption key generated by the second electronic device.

16. The method of claim 1, wherein the method pertains to a statistical database, (ii) the input signal represents a query to the database, (iii) the first electronic device comprises a query interface and the first synchronization signal requests retrieval of data records the statistical database responsive to the query, and (iii) the second synchronization signal represents processing of retrieved data records to create a report that achieves differential privacy.

17. The method of claim 1, wherein (i) the method pertains to control of a manned or unmanned flying device or vehicle in response to the input signal which represents a request for performing a task involving transportation, (ii) the first electronic device comprises a vehicle order entry system processing the request, and (iii) the second synchronization signal dispatches a suitable vehicle to perform the requested task.

18. The method of claim 17, wherein the second synchronization signal represents instructions to the dispatched vehicle to collect a payload and to deliver the payload to a destination.

19. The method of claim 1, wherein the first and second synchronization signals are each communicated in one or more of the following communication media: (i) data packets over a computer network, (ii) data packets over a cellular telephone network, (iii) other forms of wired or wireless data communication, (iv) other forms of optical communication, and (v) audio signals within or outside of a human audio range.

20. The method of claim 1, wherein the first and second synchronization signals are each communicated in one or more of: executable code or code to be interpreted.

* * * * *